US008503025B2

(12) United States Patent
Shiraishi

(10) Patent No.: US 8,503,025 B2
(45) Date of Patent: Aug. 6, 2013

(54) IMAGE PROCESSING APPARATUS, IMAGE PROCESSING METHOD, AND COMPUTER PROGRAM PRODUCT

(75) Inventor: Naoto Shiraishi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 842 days.

(21) Appl. No.: 12/656,835

(22) Filed: Feb. 17, 2010

(65) Prior Publication Data

US 2010/0238467 A1 Sep. 23, 2010

(30) Foreign Application Priority Data

Mar. 18, 2009 (JP) ................................ 2009-067059

(51) Int. Cl.
*G06F 15/00* (2006.01)
*G06F 1/00* (2006.01)

(52) U.S. Cl.
USPC ............ 358/1.9; 358/518; 358/1.13; 382/162

(58) Field of Classification Search
USPC ............... 358/1.9, 1.13, 1.6, 3.22, 3.23, 3.31, 358/518, 523, 540; 382/162, 164, 165
See application file for complete search history.

(56) References Cited

U.S. PATENT DOCUMENTS

| | | | | |
|---|---|---|---|---|
| 6,728,398 | B1 * | 4/2004 | Hondl | 382/162 |
| 2006/0279758 | A1 * | 12/2006 | Myoki | 358/1.13 |
| 2008/0267492 | A1 * | 10/2008 | Vinding | 382/162 |

FOREIGN PATENT DOCUMENTS

| | | |
|---|---|---|
| JP | 06-139364 | 5/1994 |
| JP | 11-078126 | 3/1999 |
| JP | 3218034 | 8/2001 |
| JP | 2007-216675 | 8/2007 |
| JP | 2008-078820 | 4/2008 |

OTHER PUBLICATIONS

Abstract of JP 04-186294 published on Jul. 3, 1992.

* cited by examiner

*Primary Examiner* — Marivelisse Santiago Cordero
*Assistant Examiner* — Moustapha Diaby
(74) *Attorney, Agent, or Firm* — Harness, Dickey & Pierce, P.L.C.

(57) ABSTRACT

An image processing apparatus includes a color information generating unit that generates information of color values in input image data; an Index table generating unit that generates an Index table in which a first identification information according to a hash value is associated with a first predetermined number of color values; a drawing unit that generates a second identification information according to the hash value for each color value in the input image data and performs, when the second identification information is different from the first identification information associated with a color value in the Index table having a same value, drawing according to the color value, and when the second identification information is the same as the first identification information, drawing according to the first identification information; and a converting unit that converts an image drawn by the identification information into a color value.

17 Claims, 24 Drawing Sheets

FIG. 6
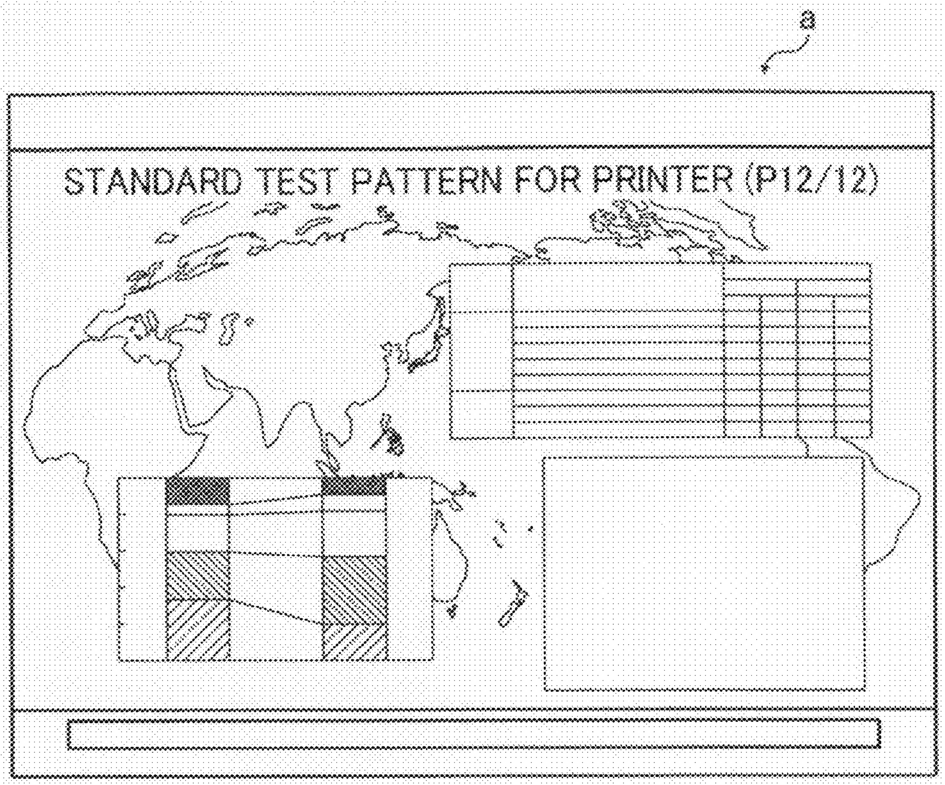
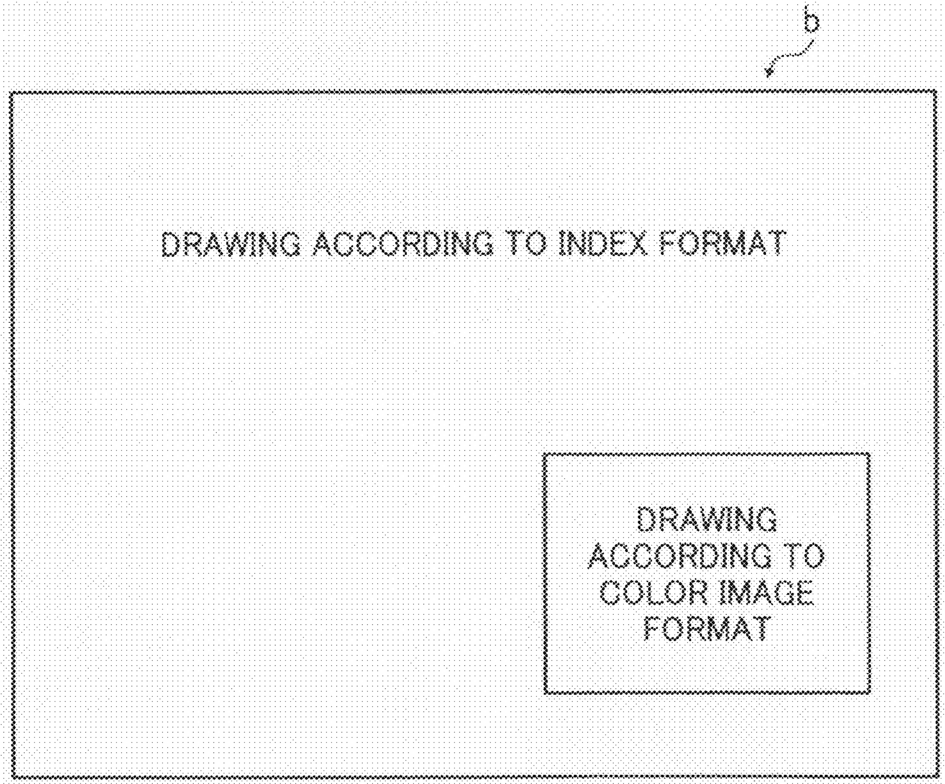

FIG. 10

| INPUT NUMBER | SQUARE MEASURE INFORMATION | COLOR INFORMATION (RGBA) |
|---|---|---|
| 0 | 165445 | 255, 255, 255, 0 |
| 1 | 120 | 0, 0, 0, 4 |
| 2 | 188 | 0, 255, 0, 4 |
| 3 | 190 | 255, 0, 0, 8 |
| 4 | 200 | 0, 0, 0, 4 |
| 5 | 188 | 100, 100, 0, 4 |
| 6 | 1000 | 0, 0, 0, 4 |
| 7 | 80 | 255, 0, 0, 8 |
| ~ | | ~ |
| n-3 | 20 | 0, 0, 255, 4 |
| n-2 | 33 | 0, 255, 0, 4 |
| n-1 | 12 | 0, 100, 0, 4 |
| n | 7650 | 0, 0, 0, 4 |

| INPUT NUMBER | SQUARE MEASURE INFORMATION | COLOR INFORMATION (RGBA) | INDEX NUMBER |
|---|---|---|---|
| 0 | 165445 | 255, 255, 255, 0 | 0 |
| 1 | 120 | 0, 0, 0, 4 | 1 |
| 2 | 188 | 0, 255, 0, 4 | 2 |
| 3 | 190 | 255, 0, 0, 8 | 6 |
| 4 | 200 | 0, 0, 0, 4 | 1 |
| 5 | 188 | 100, 100, 0, 4 | 4 |
| 6 | 1000 | 0, 0, 0, 4 | 1 |
| 7 | 80 | 255, 0, 0, 8 | 6 |
| ~ | | ~ | |
| n-3 | 20 | 0, 0, 255, 4 | 16335 |
| n-2 | 33 | 0, 255, 0, 4 | 2 |
| n-1 | 12 | 0, 100, 0, 4 | 16338 |
| n | 7650 | 0, 0, 0, 4 | 1 |

FIG. 14

| INDEX NUMBER | COLOR INFORMATION (RGBA) | TOTAL SQUARE MEASURE |
|---|---|---|
| 0 | 255, 255, 255, 0 | 165445 |
| 1 | 0, 0, 0, 4 | 25605 |
| 2 | 0, 255, 0, 4 | 1500 |
| 3 | 100, 0, 0, 4 | 3 |
| 4 | 100, 100, 0, 4 | 800 |
| 5 | 0, 88, 0, 4 | 10 |
| 6 | 255, 0, 0, 8 | 4700 |
| 7 | 0, 0, 66, 4 | 30 |
| ~ | ~ | |
| 16335 | 0, 0, 255, 4 | 20 |
| 16336 | 0, 77, 0, 8 | 6700 |
| 16337 | 33, 0, 0, 4 | 15 |
| 16338 | 00, 100, 0, 4 | 33 |

FIG. 15

| INDEX NUMBER | COLOR INFORMATION (RGBA) | SMALL INDEX NUMBER |
|---|---|---|
| 0 | 255, 255, 255, 0 | 0 |
| 1 | 0, 0, 0, 4 | 1 |
| 2 | 0, 255, 0, 4 | 66 |
| 3 | 100, 0, 0, 4 | 128 |
| 4 | 100, 100, 0, 4 | 127 |
| 5 | 0, 88, 0, 4 | 128 |
| 6 | 255, 0, 0, 8 | 8 |
| 7 | 0, 0, 66, 4 | 128 |
| ~ | ~ | |
| 16335 | 0, 0, 255, 4 | 128 |
| 16336 | 0, 77, 0, 8 | 33 |
| 16337 | 33, 0, 0, 4 | 128 |
| 16338 | 00, 100, 0, 4 | 128 |

| SMALL INDEX NUMBER | COLOR INFORMATION (RGBA) |
|---|---|
| 0 | 255, 255, 255, 0 |
| 1 | 0, 0, 0, 4 |
| 2 | 33, 255, 0, 4 |
| 3 | 30, 20, 0, 4 |
| 4 | 100, 50, 0, 4 |
| 5 | 10, 88, 0, 4 |
| 6 | 255, 100, 0, 8 |
| 7 | 10, 0, 66, 4 |
| ~ | ~ |
| 127 | 100, 100, 0, 4 |

FIG. 26A 32 bit

| |
|---|
| BAND INFORMATION SETTING COMMAND HEADER |
| FIRST ADDRESS OF BAND |
| BAND HEIGHT |
| BAND WIDTH |

FIG. 26B 32 bit

| | |
|---|---|
| SQUARE DRAWING COMMAND HEADER FOR GRAPHICS DRAWING | |
| CHARACTER OR GRAPHICS ATTRIBUTE INFORMATION | |
| STARTING POINT X COORDINATE | STARTING POINT Y COORDINATE |
| X WIDTH | Y WIDTH |

FIG. 26C 32 bit

| | |
|---|---|
| HORIZONTAL LINE DRAWING COMMAND HEADER FOR GRAPHICS DRAWING | |
| CHARACTER OR GRAPHICS ATTRIBUTE INFORMATION | |
| STARTING POINT X COORDINATE | STARTING POINT Y COORDINATE |
| X WIDTH | NOP |

FIG. 26D 32 bit

| |
|---|
| VARIABLE-POWER EXECUTION COMMAND HEADER FOR PHOTO IMAGE DRAWING |
| LOSSY COMPRESSION FLAG & PHOTO ATTRIBUTE INFORMATION |
| SOURCE IMAGE X WIDTH |
| DIS IMAGE X WIDTH |
| SOURCE IMAGE Y WIDTH |
| DIS IMAGE Y WIDTH |
| DRAWING X COORDINATE |
| DRAWING Y COORDINATE |
| FIRST ADDRESS OF SOURCE IMAGE |

FIG. 26E 32 bit

| |
|---|
| QUIT COMMAND HEADER |

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2009-067059 filed in Japan on Mar. 18, 2009.

BACKGROUND OF THE INVENTION

1. Field of the Invention

The present invention relates to an image processing apparatus, an image processing method, and a computer program product.

2. Description of the Related Art

In a conventional image forming apparatus that analyzes PDL and performs drawing, there is an image processing technology for converting a color image into an image expressed by few color values in order to perform the drawing in an image format output from a printer engine. The image processing is performed by developing an image having RGB values on a memory by using a drawing command obtained by analyzing PDL, performing a color conversion, a gradation process, and the like, and outputting the result to the printer engine.

When drawing an image on a memory, drawing requires time because a process for clearing a background, a logical operation process, a semi-transparent process, and the like are performed by RGB values. Japanese Patent Application Laid-open No. H6-139364 discloses a technology for developing input image data on a color palette and performing drawing by using the color palette. Moreover, Japanese Patent Application Laid-open No. H11-78126 discloses a technology for performing a subtractive color when the number of color palettes exceeds a predetermined number.

Furthermore, Japanese Patent Application Laid-open No. 2007-216675 discloses a technology for modifying the number of bits indicative of the number of palettes of a color palette every image data.

In Japanese Patent Application Laid-open No. H11-78126, because the number of colors of image data is reduced in accordance with the number of color palettes, this technology cannot correspond to the output of an image that requires high picture quality. Moreover, in Japanese Patent Application Laid-open No. 2007-216675, because the number of colors of a color palette increases when the number of color values of input image data increases, the speed of a drawing process decreases.

SUMMARY OF THE INVENTION

It is an object of the present invention to at least partially solve the problems in the conventional technology.

According to an aspect of the present invention there is provided an image processing apparatus including a color information generating unit that generates information of color values included in input image data; an Index table generating unit that generates an Index table in which a first identification information according to a hash value is associated with a first predetermined number of color values among the color values; a drawing unit that generates a second identification information according to the hash value for each color value included in the input image data and performs, when the second identification information is different from the first identification information associated with a color value included in the Index table having a same value as the color value, drawing according to the color value, and when the second identification information is the same as the first identification information, drawing according to the first identification information; and a converting unit that converts an image drawn by the identification information into a color value corresponding to the identification information.

According to another aspect of the present invention there is provided an image processing method in an image processing apparatus, including generating information of color values included in input image data; generating an Index table in which a first identification information according to a hash value is associated with a first predetermined number of color values among the color values; generating a second identification information according to the hash value for each color value included in the input image data; performing, when the second identification information is different from the first identification information associated with a color value included in the Index table having a same value as the color value, drawing according to the color value, and when the second identification information is the same as the first identification information, drawing according to the first identification information; and converting an image drawn by the identification information into a color value corresponding to the identification information.

According to still another aspect of the present invention there is provided a computer program product including a computer-usable medium having computer-readable program codes embodied in the medium for image processing method in an image processing apparatus, the program codes when executed causing a computer to execute generating information of color values included in input image data; generating an Index table in which a first identification information according to a hash value is associated with a first predetermined number of color values among the color values; generating a second identification information according to the hash value for each color value included in the input image data; performing, when the second identification information is different from the first identification information associated with a color value included in the Index table having a same value as the color value, drawing according to the color value, and when the second identification information is the same as the first identification information, drawing according to the first identification information; and converting an image drawn by the identification information into a color value corresponding to the identification information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram illustrating an example of an image processed by the present embodiment;

FIG. 10 is a diagram illustrating an example of the color table;

FIG. 14 is a diagram illustrating an example of a middle Index table;

FIG. 15 is a diagram illustrating an example of the Index table;

FIGS. 26A to 26E are diagrams illustrating an example of a drawing command acquired from PDL;

DETAILED DESCRIPTION OF THE PREFERRED EMBODIMENTS

Exemplary embodiments of the present invention will be explained in detail below with reference to the accompanying drawings.

Figure 1:
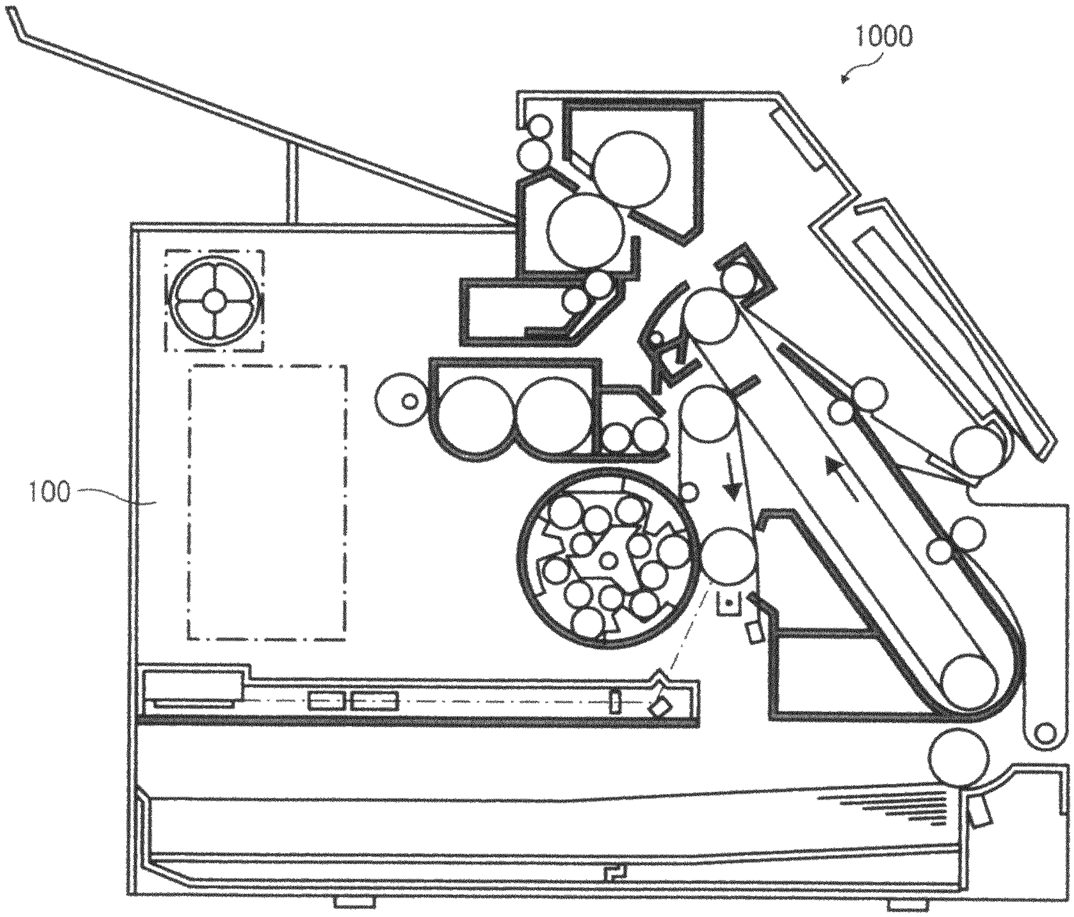
FIG. 1 is a diagram illustrating a configuration example of a mechanical section of an image forming apparatus that mounts thereon an image processing apparatus according to the present embodiment.

FIG. 1 is a diagram illustrating a configuration example of the mechanical section of an image forming apparatus that mounts thereon an image processing apparatus according to the present embodiment. In FIG. 1, a color printer 1000 is illustrated as the image forming apparatus. The color printer 1000 is an image forming apparatus having a four-drum tandem engine that forms a four-color (Y, M, C, and K) image of which the colors are respectively formed by independent imaging systems and combines the four-color image.

The color printer 1000 includes a control unit 100 that controls the operation of each unit. An image processing method according to the present embodiment is executed by the control unit 100.

Figure 2:
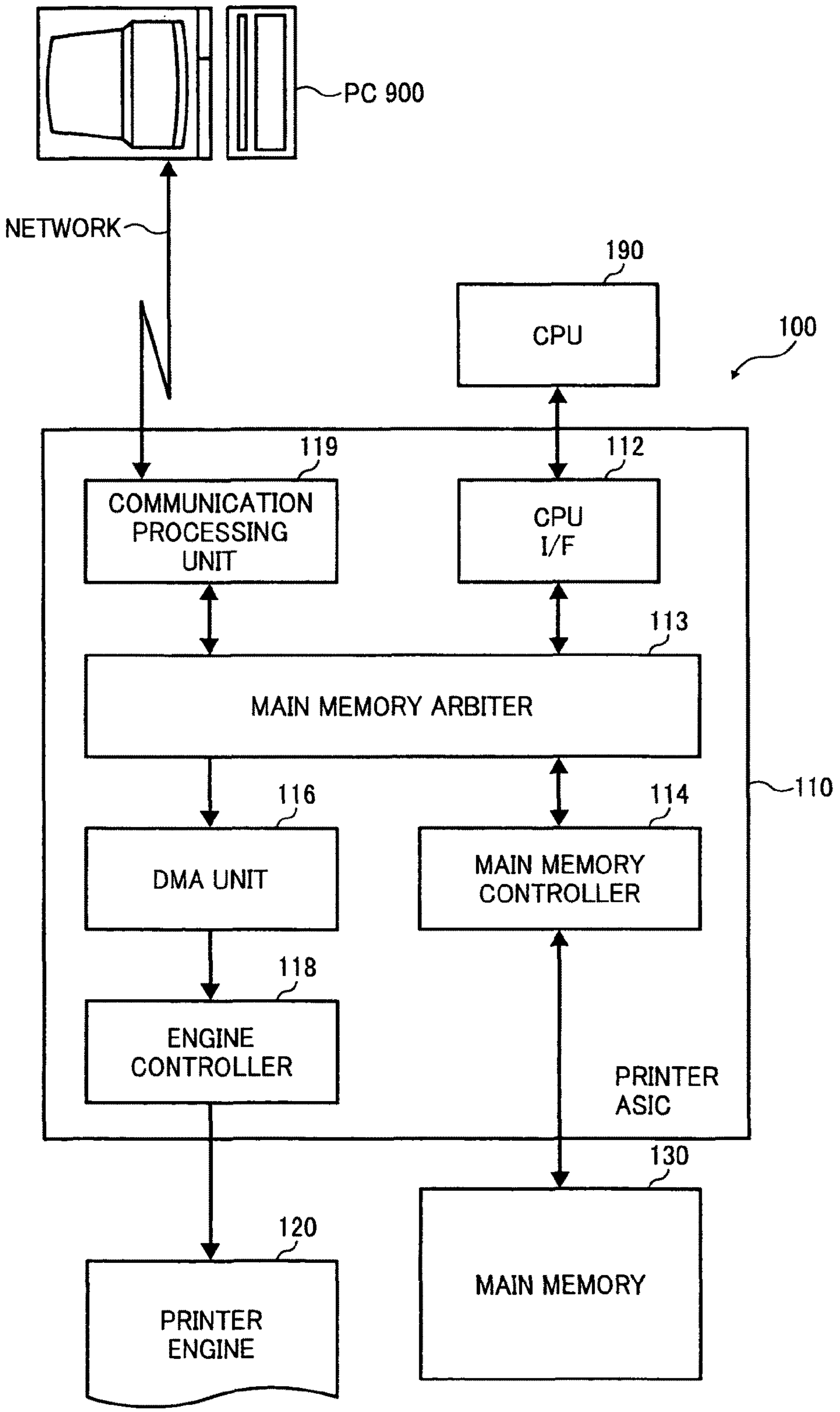
FIG. 2 is a block diagram illustrating a device configuration of a control unit of a color printer.

FIG. 2 is a block diagram illustrating a device configuration of the control unit of the color printer 1000. The control unit 100 illustrated in FIG. 2 includes a printer ASIC 110, a printer engine 120, a main memory 130, and a CPU 190. The control unit 100 is connected to a personal computer (hereinafter, "PC") 900 via a network.

The CPU 190 controls the whole of the color printer 1000. The printer engine 120 forms an image on a medium and outputs the formed image. The main memory 130 stores therein various types of data such as a drawing command output from the CPU 190, a program executed by the CPU 190, band data that is image data every band among image data, or compressed data every page. The CPU 190 further executes a computer program to realize the function of each unit of the image processing apparatus according to the present embodiment.

The printer ASIC 110 performs a predetermined process on image data to be input and outputs the image data to the printer engine 120. The printer ASIC 110, for example, includes a CPU interface (hereinafter, "CPU I/F") 112, a main memory arbiter 113, a main memory controller 114, a DMA unit 116, an engine controller 118, and a communication processing unit 119.

The CPU I/F 112 is connected to the main memory controller 114 via the main memory arbiter 113 and performs an interface process between the CPU 190 and the main memory controller 114. The main memory arbiter 113 manages the order of access or the like from the communication processing unit 119 and the CPU 190 to the main memory 130. The main memory controller 114 controls the writing and reading of data to and from the main memory 130.

The DMA unit 116 performs DMA transfer to the printer engine 120. The engine controller 118 controls the printer engine 120.

The communication processing unit 119 is a communication controller and receives image data from the PC 900 that is connected via the network. Image data, for example, has the format of PDL (page description language). The communication processing unit 119 outputs the received image data to the main memory 130.

Figure 3:
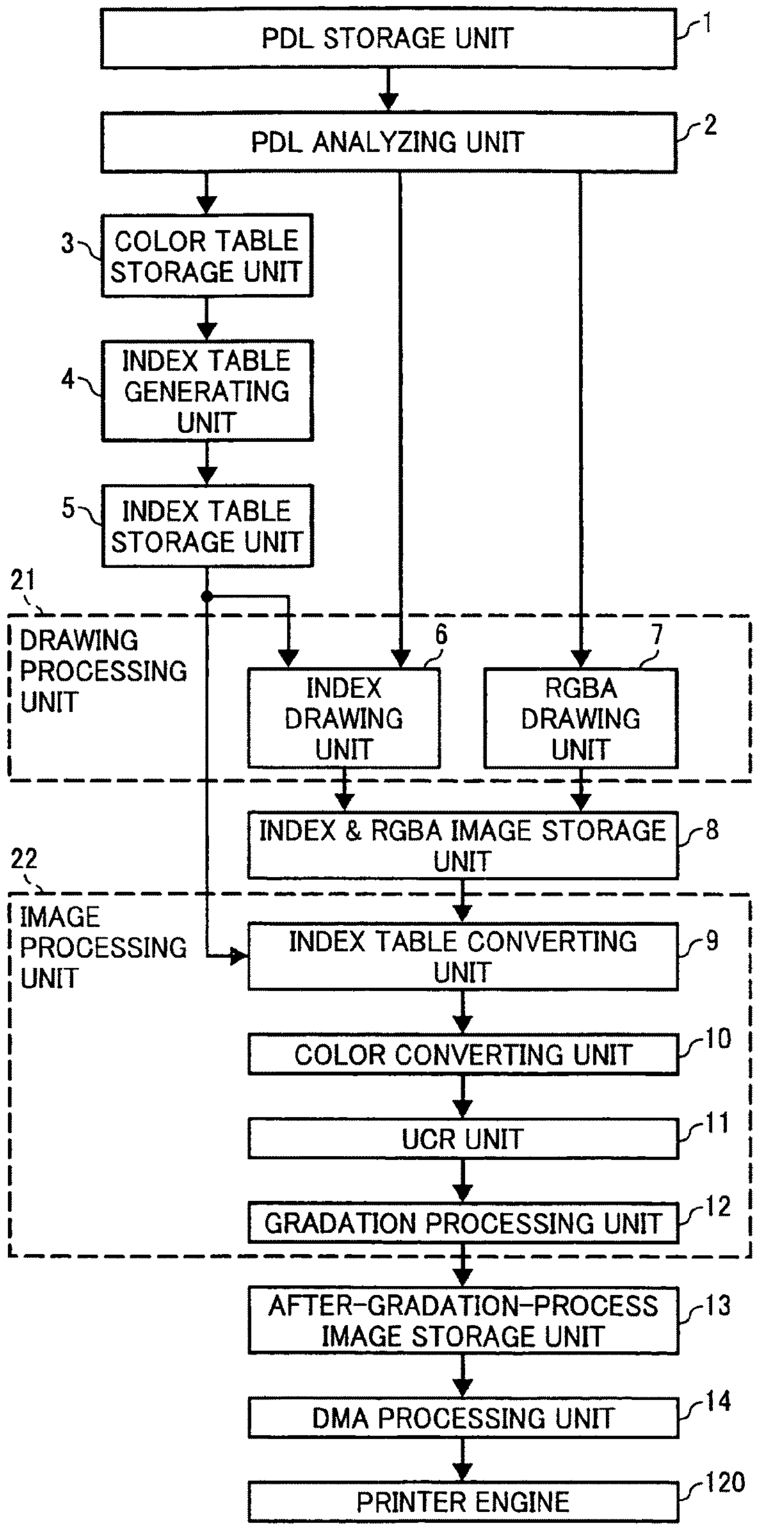
FIG. 3 is a diagram illustrating an example of a functional configuration of the control unit.

FIG. 3 is a diagram illustrating an example of a functional configuration of the control unit 100. The control unit 100 illustrated in FIG. 3 analyzes input image data, performs image processing on the analyzed image data, and outputs the processed image data to the printer engine 120. The control unit 100 illustrated in FIG. 3 includes a PDL storage unit 1, a PDL analyzing unit 2, a color table storage unit 3, an Index table generating unit 4, an Index table storage unit 5, a drawing processing unit 21, an Index & RGBA image storage unit 8, an image processing unit 22, an after-gradation-process image storage unit 13, and a DMA processing unit 14. The control unit 100 is connected to the printer engine 120.

The PDL storage unit 1 stores therein PDL transmitted from the communication processing unit 119. The PDL analyzing unit 2 analyzes the PDL stored in the PDL storage unit 1 and acquires a graphics command and a photo image command. In the case of graphics command, the PDL analyzing unit 2 generates a color table and then outputs the color table to the color table storage unit 3. The PDL analyzing unit 2 outputs a drawing command according to Index to the drawing processing unit 21. In the case of photo image command, the PDL analyzing unit 2 outputs color information and a drawing command to the drawing processing unit 21.

The color table storage unit 3 stores therein a color table. The Index table generating unit 4 generates an Index table from the color table stored in the color table storage unit 3.

The generated Index table is stored in the Index table storage unit 5. The Index table storage unit 5 stores therein an Index table.

The drawing processing unit 21 includes an RGBA drawing unit 7 and an Index drawing unit 6. The RGBA drawing unit 7 receives color information and a drawing command of a color image from the PDL analyzing unit 2. The RGBA drawing unit 7 draws an image having an RGBA format.

The Index drawing unit 6 performs drawing according to an Index value on the basis of the drawing command according to Index input from the PDL analyzing unit 2 and the Index table. Because the drawing according to an Index value requires a few components as compared with the drawing of a color image, the drawing according to an Index value has a few drawing planes. Therefore, a drawing process can be performed at high speed by drawing an image expressed by a few colors such as a graphic image by using an Index value.

The Index & RGBA image storage unit 8 stores therein images drawn by the RGBA drawing unit 7 and the Index drawing unit 6.

The image processing unit 22 includes an Index table converting unit 9, a color converting unit 10, a UCR unit 11, and a gradation processing unit 12. The Index table converting unit 9 converts the Index value of an image drawn by the Index value, among the images stored in the Index & RGBA image storage unit 8, into a color value. As a result, the image becomes an image drawn by an RGB value. The Index table converting unit 9 acquires the Index table from the Index table storage unit 5.

The color converting unit 10 converts a color image expressed with a RGB value into a color image expressed with a CMY value. The UCR unit 11 performs under-color removal on the color image expressed with a CMY value and generates a color image expressed with a CMYK value. The gradation processing unit 12 performs a gradation process on the color image expressed with a CMYK value. As a result, the color image becomes an image expressed by area coverage modulation such as dithering.

The after-gradation-process image storage unit 13 stores an image processed by the image processing unit 22. The image data stored in the after-gradation-process image storage unit 13 is image data that is processed by area coverage modulation and is output by a printer.

The DMA processing unit 14 outputs image data to the printer engine 120 by using DMA transfer. The printer engine 120 forms an image and outputs the formed image by using the input image data as a medium.

In FIG. 3, the PDL analyzing unit 2, each unit of the drawing processing unit 21, and each unit of the image processing unit 22 are realized by, for example, making the CPU 190 execute a computer program.

Moreover, in FIG. 3, the PDL storage unit 1, the color table storage unit 3, the Index table storage unit 5, the Index & RGBA image storage unit 8, and the after-gradation-process image storage unit 13 are provided on, for example, the main memory 130.

Figure 4:
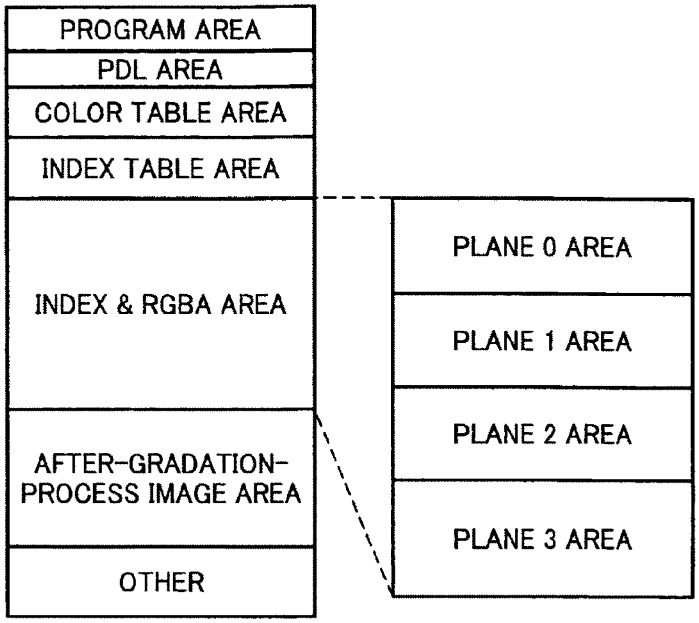
FIG. 4 is a diagram explaining each area provided on a main memory.

FIG. 4 is a diagram explaining each area provided on the main memory 130. In FIG. 4, a program area, a PDL area, a color table area, an Index table area, an Index & RGBA area, an after-gradation-process image area, and an area for storing the other information are provided on the main memory 130. The program area is an area that stores a program executed by the CPU 190. The PDL area corresponds to the PDL storage unit 1. The color table area corresponds to the color table storage unit 3. The Index table area corresponds to the Index table storage unit 5. The Index & RGBA area corresponds to the Index & RGBA image storage unit 8. The after-gradation-process image area corresponds to the after-gradation-process image storage unit 13.

The Index & RGBA area has a plane 0 area, a plane 1 area, a plane 2 area, and a plane 3 area. Each of the plane 0 to plane 3 areas stores image data for a corresponding color component. For example, an R value is stored in the plane 1 area, a G value is stored in the plane 2 area, a B value is stored in the plane 3 area, and an attribute value is stored in the plane 0 area. An image drawn by an Index value can be further stored in the plane 0 area. Moreover, Index values can be stored in the plane 0 area and the plane 1 area when the Index values have the number of bits over every two planes. As a result, both of an image drawn by an Index value and an image drawn by a RGBA value can be stored every four planes.

Figure 5:
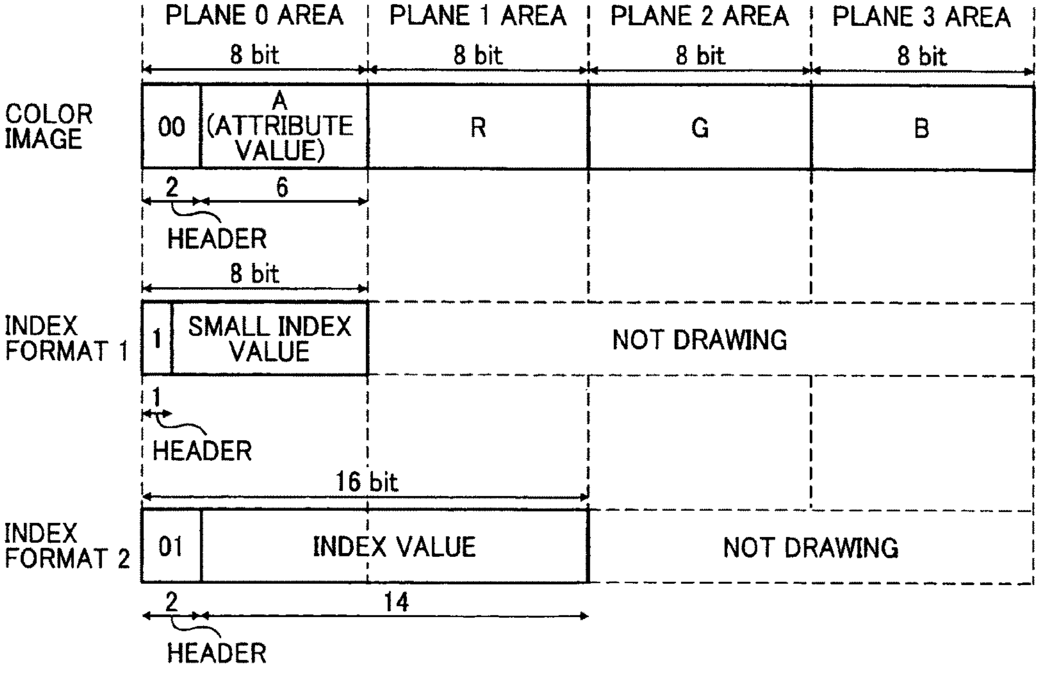
FIG. 5 is a diagram explaining an image format.

FIG. 5 is a diagram explaining an image format. In FIG. 5, both of a format of color image and a format according to an Index value are illustrated. The format of color image has 32 bits that includes eight bits consisting of a header and an attribute value (hereinafter, "A") and 24 bits consisting of an 8-bit R value, an 8-bit G value, and an 8-bit B value. Each 8-bit data of these image data is stored in the plane 0 area to the plane 3 area.

A format according to an Index value has an Index format 1 and an Index format 2. The Index format 1 is an 8-bit format that consists of a 1-bit header and from a 7-bit small Index table value. The image data of the Index format 1 is stored in the plane 0 area.

The Index format 2 is a 16-bit format that consists of a 2-bit header and a 14-bit Index table value. The Index format 2 is stored in the plane 0 area and the plane 1 area.

FIG. 6 is a diagram illustrating an example of an image processed by the present embodiment. FIG. 6 illustrates an image "a" and an image "b". The image "a" is a diagram illustrating an example of an image processed by the present embodiment. The image "a" has a photo image part and a graphics image part. The image "b" is a diagram illustrating an example drawn on the main memory 130. In the image "b", a graphics image part is drawn by an Index value and a photo image part is drawn by a color image format.

Figure 7:
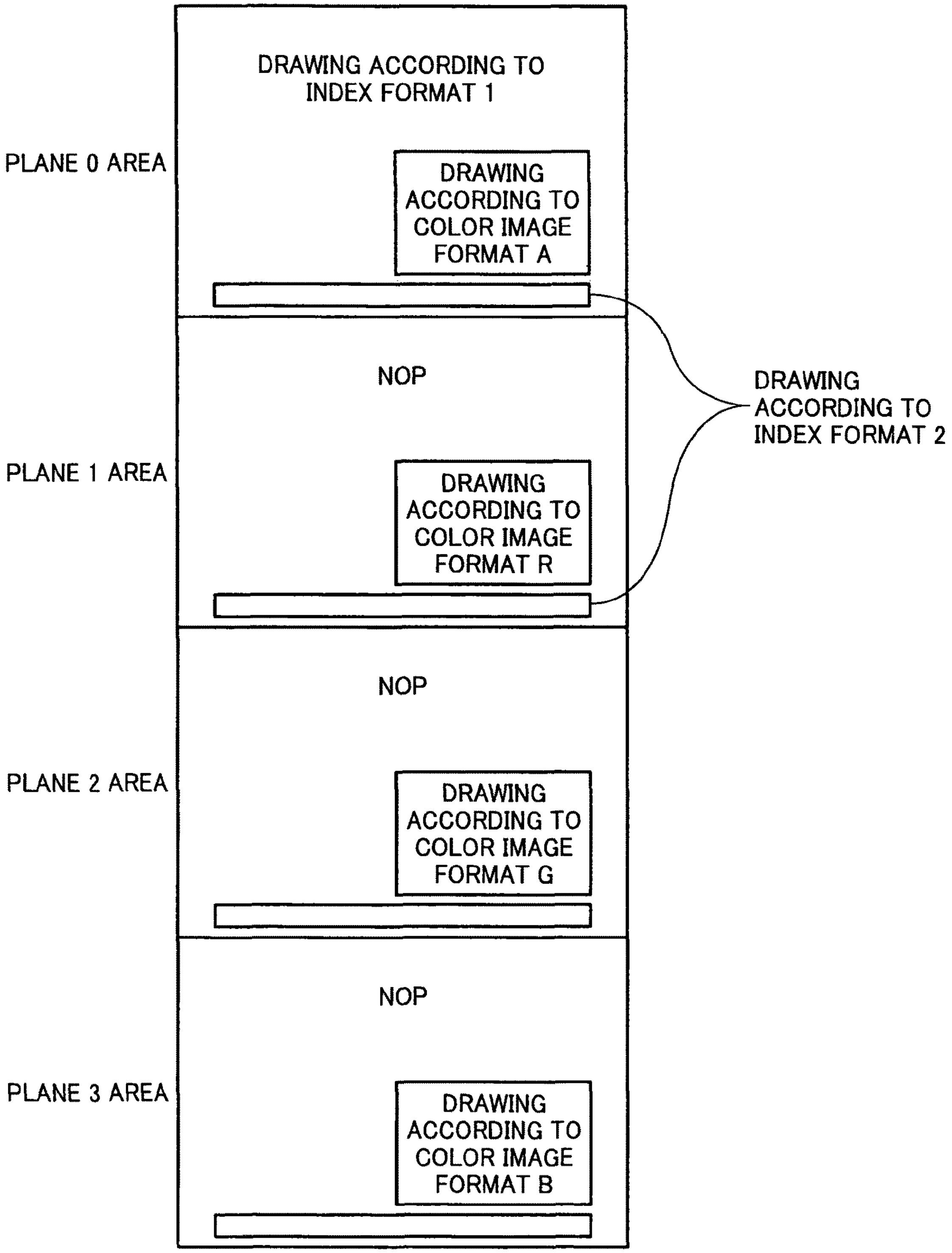
FIG. 7 is a diagram illustrating each plane of the main memory that stores an image "b"

FIG. 7 is a diagram illustrating each plane of the main memory 130 in which the image "b" of FIG. 6 is stored. In FIG. 7, a plane 0 area has an area drawn by the Index format 1, an area drawn by an A value among color image formats, and an area drawn by high-order eight bits of the Index format 2.

A plane 1 area has an area drawn by an R value among color image formats and an area drawn by low-order eight bits of the Index format 2. A plane 2 area has an area drawn by a G value among color image formats and a plane 3 area has an area drawn by a B value among color image formats.

As illustrated in FIG. 7, the plane 1 to 3 areas do not have an area drawn by the Index format 1. Moreover, the plane 2 and 3 areas do not have an area drawn by the Index format 2. As a result, drawing can be performed at high speed.

Figure 8:
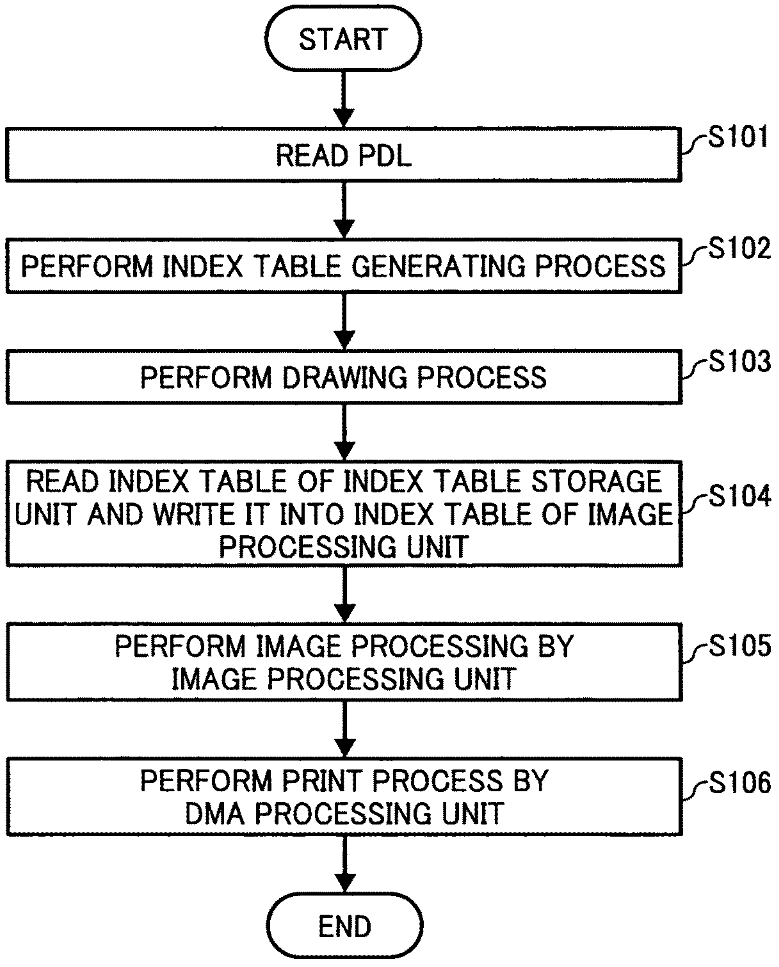
FIG. 8 is a flowchart explaining the whole of an image processing method according to the present embodiment.

FIG. 8 is a flowchart explaining the whole of an image processing method according to the present embodiment. At Step S101 illustrated in FIG. 8, the PDL storage unit 1 reads PDL and the PDL analyzing unit 2 analyzes the PDL. At Step S102, the Index table generating unit 4 generates an Index table. At Step S103, the drawing processing unit 21 draws an image on the main memory 130.

At Step S104, the Index table stored in the Index table storage unit 5 is stored in a buffer included in the image processing unit 22.

At Step S105, the image processing unit 22 converts an Index value into an RGB value, performs color conversion, a UCR process, a gradation process, and the like, and generates gray-scale image data according to CMYK for print.

At Step S106, the DMA processing unit 14 transmits image data to the printer engine 120 in a DMA method and the printer engine 120 performs a print process.

Figure 9:
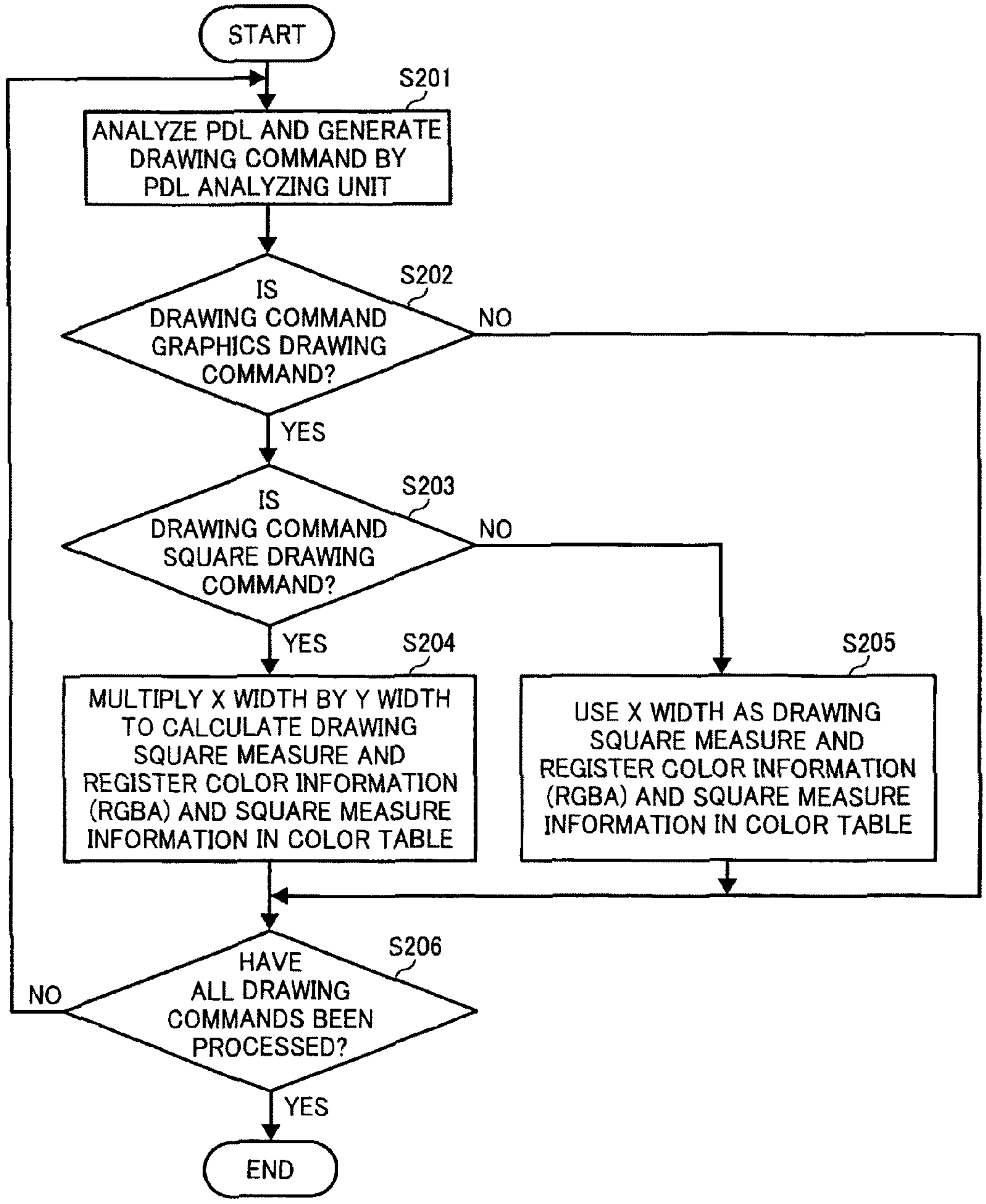
FIG. 9 is a diagram explaining a process for generating a color table.

FIG. 9 is a diagram explaining a process for generating a color table. The process illustrated in FIG. 9 is performed by the PDL analyzing unit 2. At Step S201 illustrated in FIG. 9, the PDL analyzing unit 2 analyzes the PDL and generates a drawing command. At Step S202, the PDL analyzing unit 2 determines whether the generated drawing command is a graphics drawing command. The process control advances to Step S203 when the generated drawing command is a graphics drawing command. On the other hand, when the generated drawing command is not a graphics drawing command, the process control advances to Step S206 because the process according to the flow is not performed and an RGBA drawing process is performed.

At Step S203, the PDL analyzing unit 2 determines whether the drawing command generated at Step S201 is a square drawing command. The process control advances to Step S204 when the drawing command is a square drawing command. On the other hand, the process control advances to Step S205 when the drawing command is not a square drawing command.

At Step S204, the PDL analyzing unit 2 multiplies the X width by the Y width of the square to be drawn to calculate a drawing square measure. Furthermore, the PDL analyzing unit 2 registers the calculated drawing square measure in the color table. In the color table, an RGBA value and square measure information are associated with each other. On the other hand, at Step S205 following Step S203, the PDL analyzing unit 2 assumes that the X width is a drawing square measure and registers an RGBA value and square measure information, which are associated with each other, in the color table.

When the same RGBA value is present for different drawing commands, an RGBA value and square measure information can be associated with each other for each drawing command. Moreover, an RGBA value and total square measure information obtained by adding a drawing square measure to the same RGBA value can be associated each other.

The process control advances to Step S206 following Step S204 or Step S205, the PDL analyzing unit 2 determines whether all drawing commands included in PDL are processed. When all drawing commands are terminated, the process is terminated. When a drawing command that is not processed is present, the process control returns to Step S201 to repeat the process.

FIG. 10 is a diagram illustrating an example of a color table. In FIG. 10, square measure information and a color value are associated for each "input number" according to an input sequence. In this case, color value information can be referred to as "color information".

Figure 11:
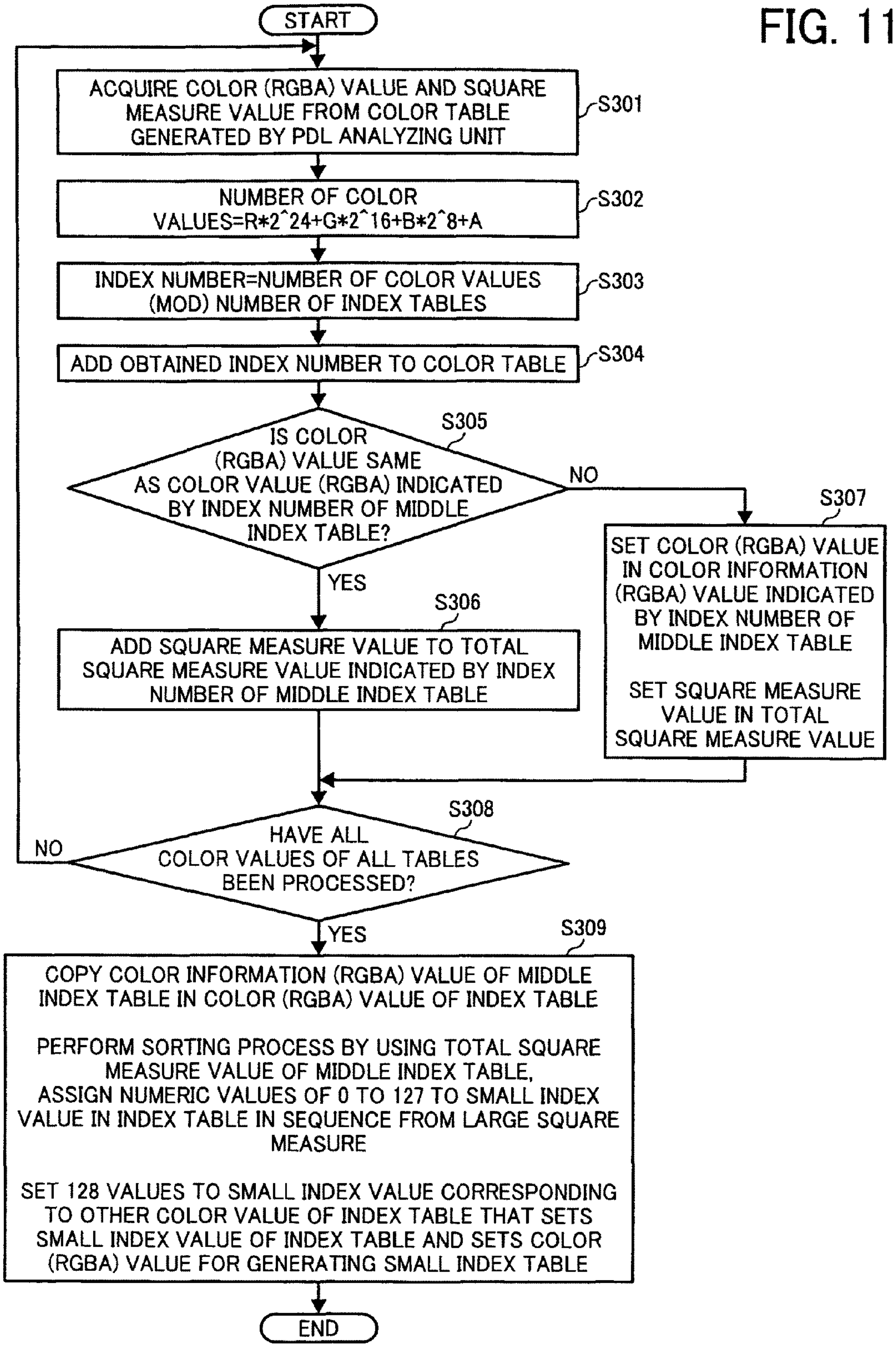
FIG. 11 is a diagram explaining a process for generating an Index table.

FIG. 11 is a diagram explaining a process for generating an Index table. The process of FIG. 11 is performed by the Index table generating unit 4. At Step S301, the Index table generating unit 4 acquires one record obtained by combining a color value according to an RGBA value and square measure information from the color table generated by the PDL analyzing unit. At Step S302, the Index table generating unit 4 calculates the number of color values. The number of color values is calculated by the following formula.

$$(\text{Number of color values}) = R*2\hat{}24+G*2\hat{}16+B*2\hat{}8+A$$

At Step S303, the Index table generating unit 4 calculates an Index number by using computation. The Index number is calculated by the following formula.

$$\text{Index number} = \text{Number of color values (MOD) Number of index tables}$$

Figures 12, 13:
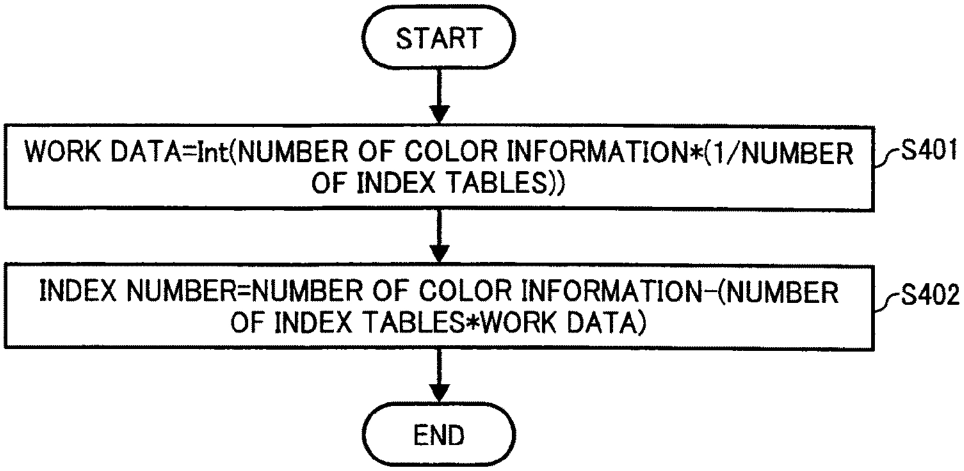
FIG. 12 is a flowchart illustrating a process for calculating an Index number.
FIG. 13 is a diagram illustrating a color table to which an Index number is added.

More specifically, the Index number can be calculated by using a process illustrated in the flow chart shown in FIG. 12. At Step S401 of FIG. 12, it is assumed that WORK data is a number that is obtained by rounding off a number obtained by multiplying the inverse number of the number of index tables by the number of color values to make the number as an integer number.

At Step S402, it is assumed that an Index number is a number that is obtained by subtracting a number obtained by multiplying the number of index tables by the WORK data from the number of color values.

Returning to FIG. 11, at Step S304, the Index table generating unit 4 adds the Index number calculated at Step S303 to the information of the color table acquired at Step S301 and updates the color table. FIG. 13 is a diagram illustrating a color table to which an Index number is added. In FIG. 13, an Index number is added to the color table of FIG. 10.

At Step S305, the Index table generating unit 4 refers to a record of the Index number generated at Step S303 among records included in an Index table (hereinafter, "middle Index table") that is currently being created. Then, the Index table generating unit 4 determines whether the color value of the referred-to record is the same as a color value by which an Index number is generated at Step S304. The process control advances to Step S306 when the color value of the referred-to record is the same as a color value. On the other hand, the process control advances to Step S307 when the color value of the referred-to record is not the same as a color value.

FIG. 14 is a diagram illustrating an example of a middle Index table. In FIG. 14, an Index number is associated with a color value and total square measure information.

In regard to color information that is first processed among color information included in PDL, a middle Index table cannot be present. When the middle Index table is not present, the process control advances to Step S306.

At Step S306, the Index table generating unit 4 adds a square measure included in the record acquired at Step S301 to a total square measure of the corresponding Index number of the middle Index table and updates total square measure information.

At Step S307, the Index table generating unit 4 sets the color value included in the record acquired at Step S301 in the item of the color value of the corresponding Index number of the middle Index table and further sets square measure information included in the record acquired at Step S301 in the corresponding total square measure information.

The process control advances to Step S308 following Step S306 or Step S307. At Step S308, the Index table generating unit 4 determines whether the process is terminated for all color values included in the color table. When the process is terminated, the process control advances to Step S309. On the other hand, when a record that is not processed is present, the process control returns to Step S301 to repeat the process.

At Step S309 following Step S308, the Index table generating unit 4 copies the record of the color value included in the middle Index table in the Index table. Furthermore, the Index table generating unit 4 performs a process for sorting records by using total square measure information included in each record of the middle Index table and gives a small Index value to each record in sequence from a large square measure. A small Index value is a numeric value from 0 to 127. The Index table generating unit 4 sets the given small Index value as a small Index value for the corresponding record of the Index table.

At Step S309, the Index table generating unit 4 further generates a small Index table that consists of records having small Index values and sets the color value of the processed record.

Moreover, the Index table generating unit 4 sets a small Index value to 128 in each record of the Index table to which a small Index value is not given so far.

Figures 16, 17:
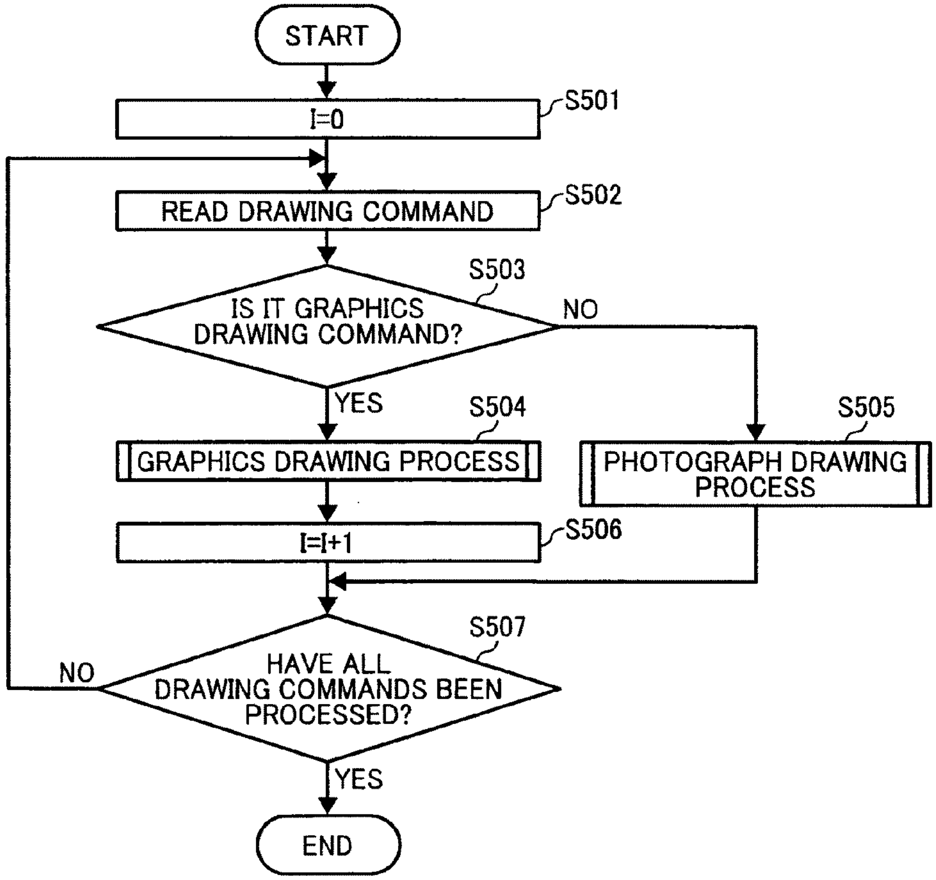
FIG. 16 is a diagram illustrating an example of a small Index table.
FIG. 17 is a flowchart explaining a drawing process.

FIG. 15 is a diagram illustrating an example of an Index table. In the Index table, an Index number is associated with a color value and a small Index number. FIG. 16 is a diagram illustrating an example of a small Index table. In the small Index table, Index numbers from 0 to 127 are associated with color values.

FIG. 17 is a flowchart explaining a drawing process performed in the drawing processing unit 21. The drawing process of FIG. 17 is realized by the RGBA drawing unit 7 and the Index drawing unit 6.

At Step S501, the value of a counter I that counts the number of the color table is initialized to be I=0. At Step S502, the drawing command analyzed by the PDL analyzing unit 2 is read. At Step S503, it is determined whether the read drawing command is a graphics drawing command. The process control advances to Step S504 when the read drawing command is a graphics drawing command. On the other hand, the process control advances to Step S505 when the read drawing command is not a graphics drawing command.

At Step S504, the Index drawing unit 6 performs a graphics drawing process. On the other hand, at Step S505, the RGBA drawing unit 7 performs a photograph drawing process. A photograph drawing process is a drawing process according to an RGB value. The process control advances to Step S506 following Step S504 to add one to the value of the counter I.

At Step S507 following Step S505 or Step S506, it is determined whether the processes corresponding to all drawing commands that are obtained by being analyzed by the PDL analyzing unit are terminated. When all processes are terminated, the process is terminated. When a drawing command that is not processed is present, the process control returns to Step S502 to repeat the process.

Figure 18:
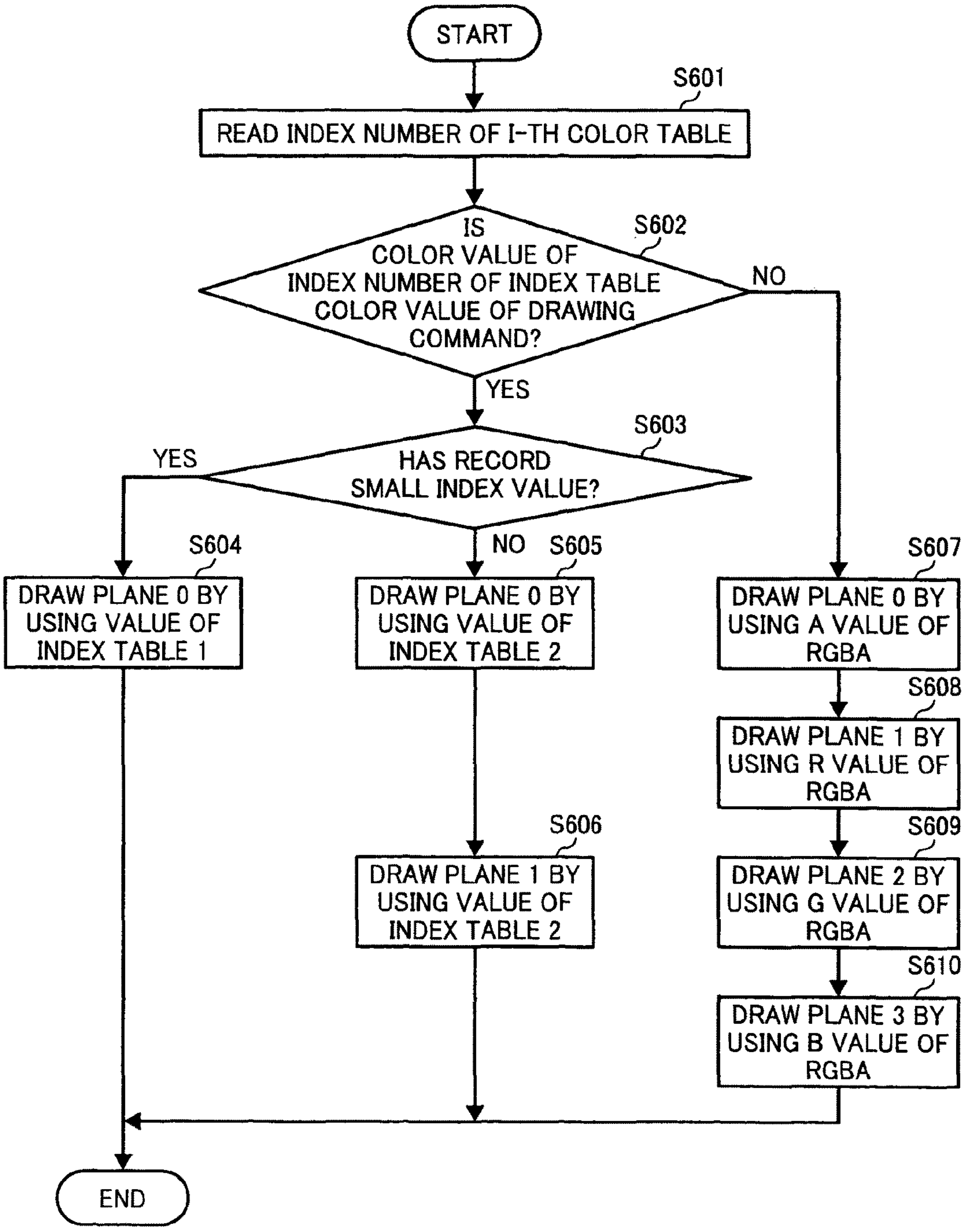
FIG. 18 is a flowchart explaining a graphics drawing process.

FIG. 18 is a flowchart explaining a graphics drawing process performed at Step S504. The graphics drawing process is executed by the Index drawing unit 6. At Step S601 of FIG. 18, the Index drawing unit 6 acquires the Index number of an I-th record among records of the color table.

At Step S602 following Step S601, the Index drawing unit 6 determines whether the color value of the Index number in the Index table acquired at Step S601 is the color value of a drawing command. The process control advances to Step S603 when the color value of the Index number is the color value of a drawing command. On the other hand, the process control advances to Step S607 when the color value of the Index number is different from the color value of a drawing command.

The case where the color value of the Index number is different from the color value of a drawing command means that the number of color values calculated in the process of FIG. 11, that is, hash values according to a hash function collide. Therefore, instead of drawing according to an Index format, drawing according to a color value is performed.

At Step S603 following Step S602, the Index drawing unit 6 determines whether the record of the Index number acquired at Step S601 includes a small Index value. The case where the record includes a small Index value means that the small Index value of the record has one value of 0 to 127. The process control advances to Step S604 when the record includes a small Index value. On the other hand, the process control advances to Step S605 when the record does not include a small Index value.

At Step S604, the Index drawing unit 6 draws the plane 0 area by using the value of the Index table 1. On the other hand, at Step S605, the Index drawing unit 6 draws the plane 0 area by using a high-order 8-bit value of the Index table 2. At Step S606 following Step S605, the Index drawing unit 6 draws the plane 1 area by using a low-order 8-bit value of the Index table 2.

At Step S607 following Step S602, the Index drawing unit 6 draws the plane 0 area by using the A value of RGBA. At Step S608, the Index drawing unit 6 draws the plane 1 area by using the R value of RGBA. At Step S609, the Index drawing unit 6 draws the plane 2 area by using the G value of RGBA. At Step S610, the Index drawing unit 6 draws the plane 3 area by using the B value of RGBA.

Figure 19:
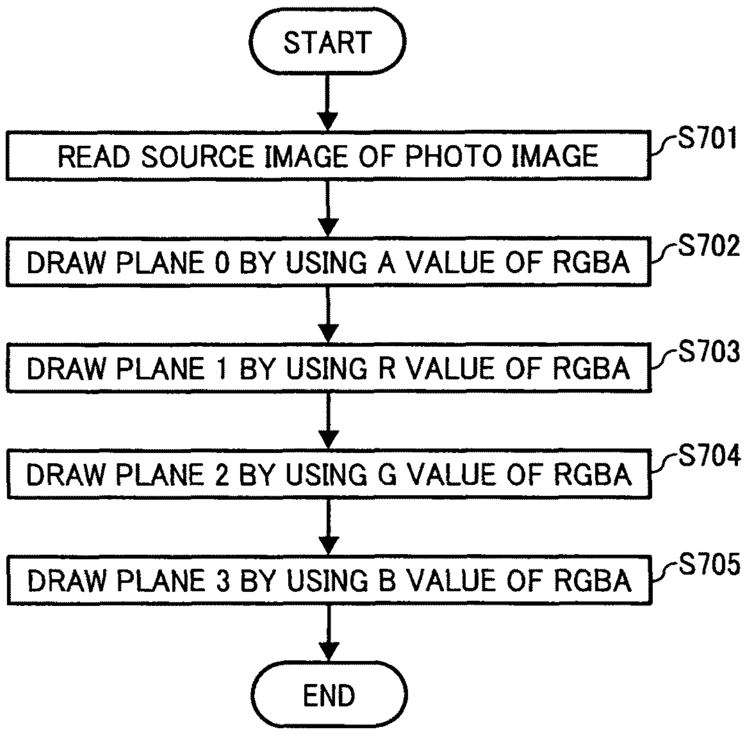
FIG. 19 is a flowchart illustrating a process for drawing a photo image by using a color value.

FIG. 19 is a flowchart illustrating a process for drawing a photo image by using a color value. The process of FIG. 19 is executed by the RGBA drawing unit 7. At Step S701 of FIG. 19, the RGBA drawing unit 7 acquires the source image of a photo image. Because the process of Step S702 to Step S705 is the same as the process of Step S607 to Step S610 of FIG. 18, their descriptions are omitted.

Figure 20:
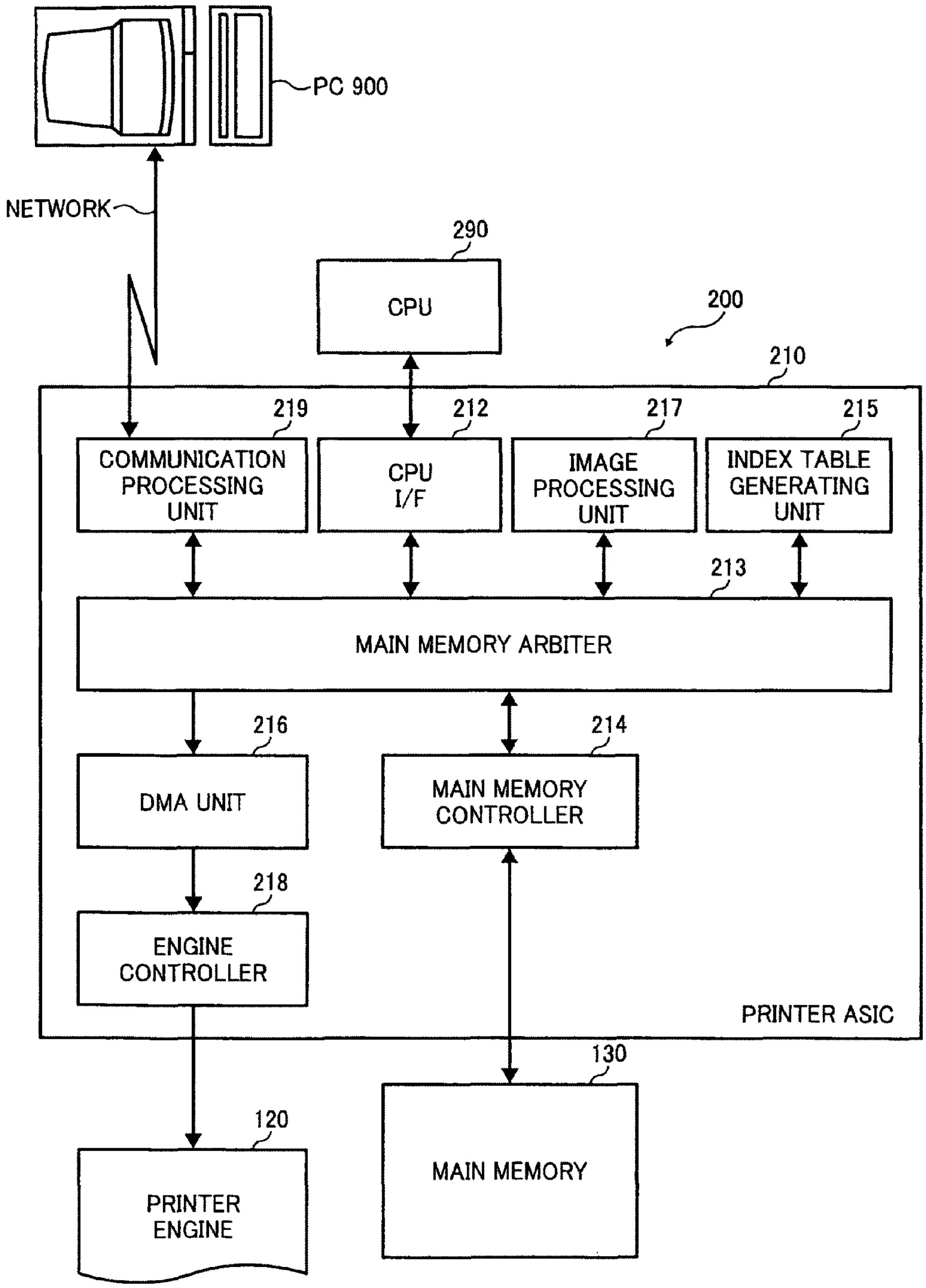
FIG. 20 is a diagram illustrating the hardware configuration of a control unit.

FIG. 20 is a diagram illustrating the hardware configuration of a control unit 200. The control unit 200 is provided in the color printer 1000 in place of the control unit 100 and realizes the same function. The control unit 200 includes a printer ASIC 210, the printer engine 120, the main memory 130, and a CPU 290 and is connected to the personal computer (PC) 900 via a network.

For example, the printer ASIC 210 includes a CPU interface (hereinafter, "CPU I/F") 212, a main memory arbiter 213, a main memory controller 214, an image processing unit 217, an Index table generating unit 215, a DMA unit 216, an engine controller 218, and a communication processing unit 219.

The units of the control unit 200 that have a function different from the control unit 100 are the image processing unit 217, the Index table generating unit 215, and the CPU 290. Because the other units have the same function and configuration as those of each unit of the control unit 100, their descriptions are omitted.

The image processing unit 217 is provided in the printer ASIC 210 and is dedicated hardware for realizing the function of the image processing unit 22. The Index table generating unit 215 is provided in the printer ASIC and is dedicated hardware for realizing the function of the Index table generating unit 4. The CPU 290 executes a computer program to realize the function of the drawing processing unit 21 and the DMA processing unit 14.

Figure 21:
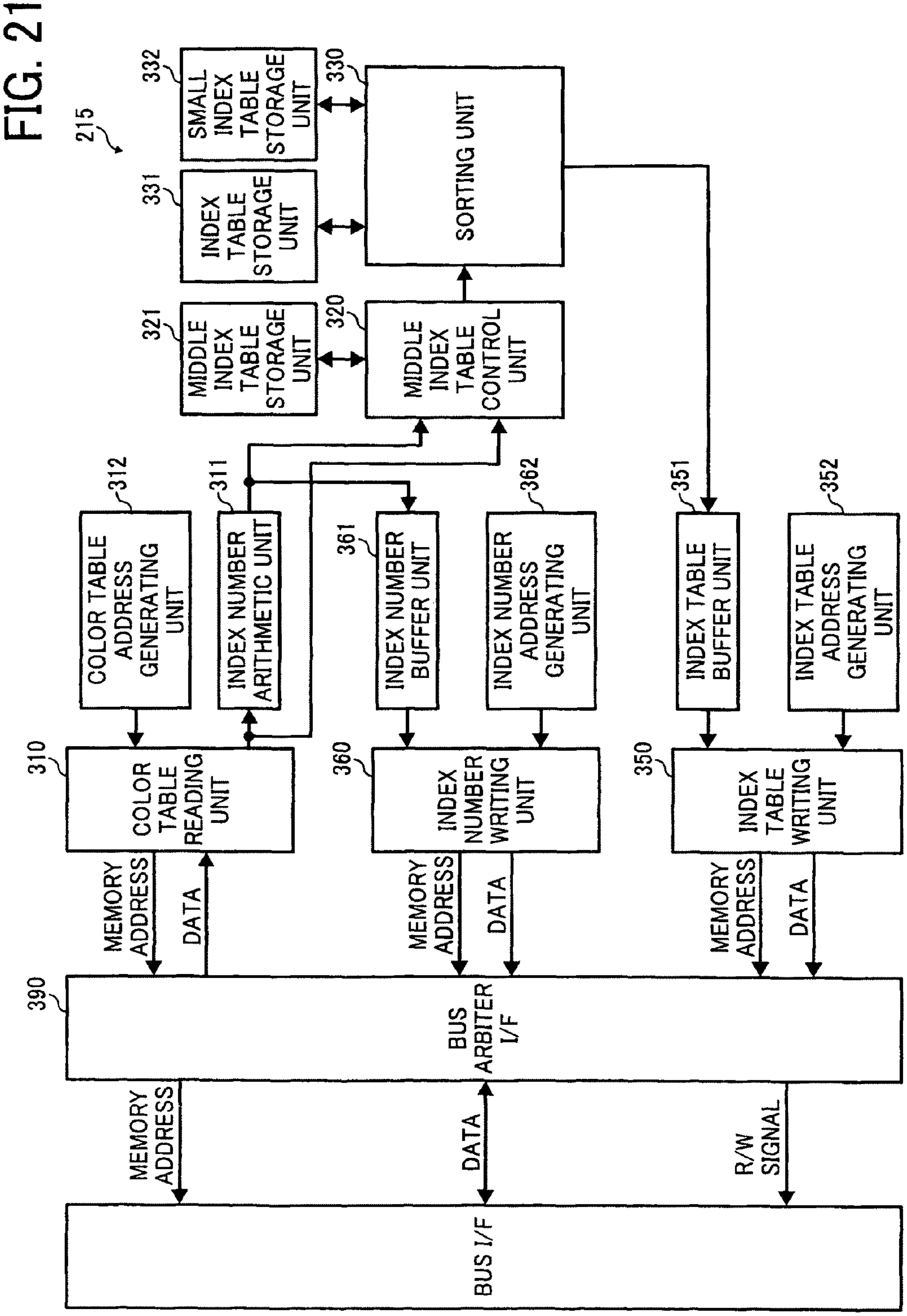
FIG. 21 is a diagram illustrating the hardware configuration of an Index table generating unit.

FIG. 21 is a diagram illustrating the hardware configuration of the Index table generating unit 215. The Index table generating unit 215 includes a bus arbiter I/F 390, a color table reading unit 310, a color table address generating unit 312, an Index number arithmetic unit 311, a middle Index table control unit 320, a middle Index table storage unit 321, a sorting unit 330, an Index table storage unit 331, a small Index table storage unit 332, an Index number buffer unit 361, an Index number address generating unit 362, an Index number writing unit 360, an Index table writing unit 350, an Index table buffer unit 351, and an Index table address generating unit 352.

The bus arbiter I/F 390 adjusts to input data from the main memory 130 into the Index table generating unit 215 and to output data from the Index table generating unit 215 to the main memory 130.

The color table reading unit 310 executes the process of Step S301 of FIG. 11. The color table address generating unit 312 generates an address on the main memory when the color table reading unit 310 reads a color value and the like.

The Index number arithmetic unit 311 executes the process of Step S302 and Step S303 of FIG. 11.

The middle Index table control unit 320 executes the process of Step S306 and Step S307 of FIG. 11. The middle Index table storage unit 321 stores a middle Index table. The sorting unit 330 performs a sorting process according to a square measure among the processes of Step S309 of FIG. 11. The Index table storage unit 331 stores an Index table. The small Index table storage unit 332 stores a small Index table.

The Index number buffer unit 361 holds a generated Index number. The Index number writing unit 360 makes the main memory 130 store the Index number held in the Index number buffer unit 361 on an area thereof. The Index number address generating unit 362 generates an address on the main memory 130 when the Index number is stored on the main memory 130.

The Index table buffer unit 351 holds a generated Index table. The Index table writing unit 350 causes the main memory 130 to store the Index table on an area thereof. The Index table address generating unit 352 generates an address on the main memory 130 when the Index table is stored on the main memory 130.

Figure 22:
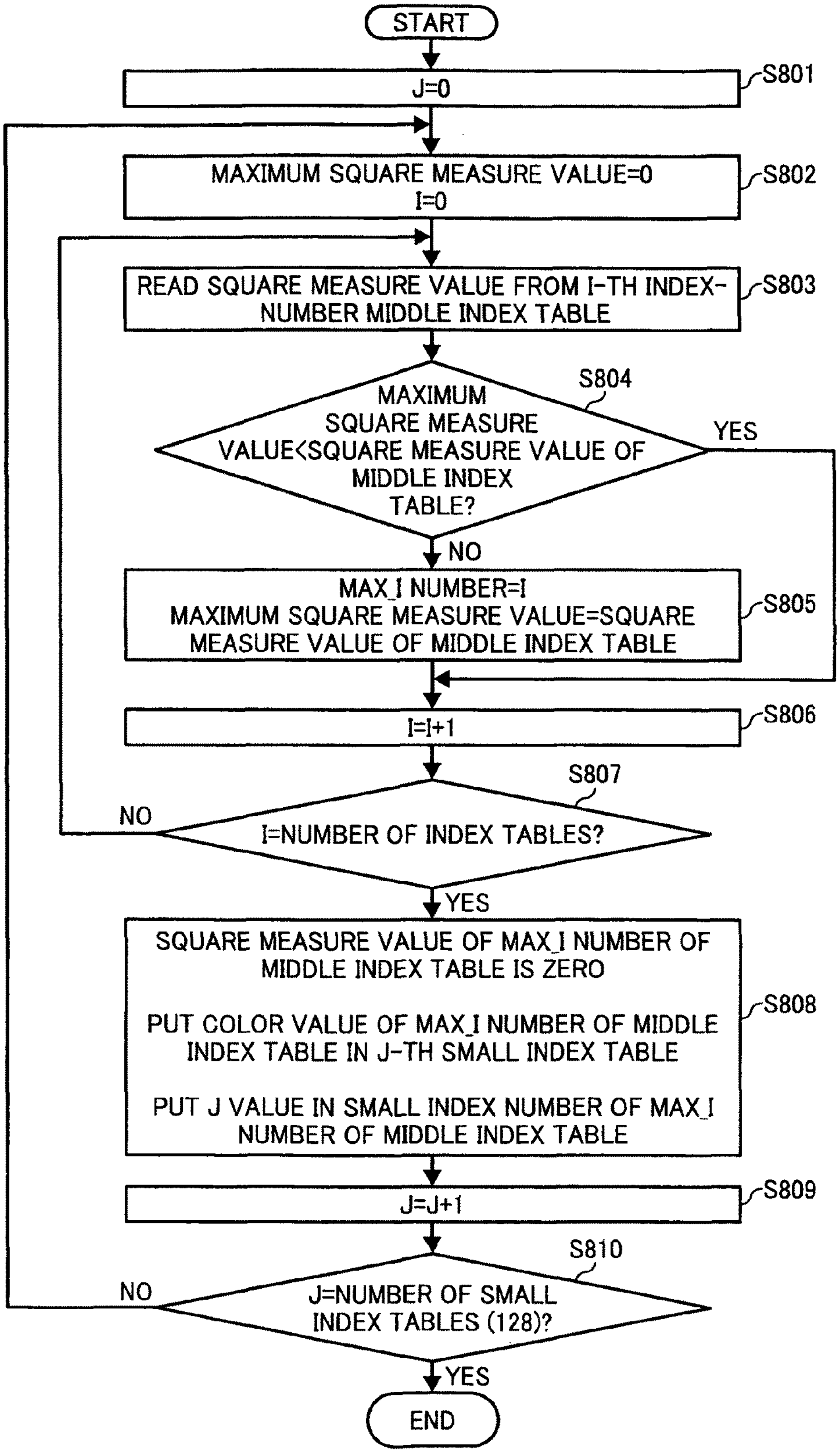
FIG. 22 is a flowchart illustrating a sorting process performed in a sorting unit.

FIG. 22 is a flowchart illustrating a sorting process performed in the sorting unit 330. At Step S801 of FIG. 22, the sorting unit 330 initializes a counter J that indicates a small Index value to zero. At Step S802, the sorting unit 330 initializes MAX that is the maximum value of a square measure to zero. At Step S802, the sorting unit 330 further initializes a counter I that indicates an Index number to zero.

At Step S803, the sorting unit 330 reads the square measure value of an I-th Index number in the middle Index table. At Step S804, the sorting unit 330 determines whether a variable (MAX square measure value) indicating the maximum square measure value is smaller than the square measure value of the middle Index number read at Step S803. The process control advances to Step S806 when the variable is smaller than the square measure value. On the other hand, the process control advances to Step S805 when the variable is not smaller than the square measure value.

At Step S805, it is assumed that a variable (MAX_I number) indicating an Index number having the maximum square measure value is I. At Step S805, the sorting unit 330 further assigns the square measure value of the middle Index number read at Step S803 to the value of (MAX square measure value).

At Step S806 following Step S804 or Step S805, the sorting unit 330 adds one to the value of the counter I.

At Step S807, the sorting unit 330 determines whether the value of the counter I is the same as the number of records of the Index table. When the value of the counter I is the same as the number of records, in other words, when the process of Step S803 to Step S806 is performed on all the records of the Index table, the process control advances to Step S808. On the other hand, the process control returns to Step S803 to repeat the process when the value of the counter I is not the same as the number of records.

At Step S808, it is assumed that a square measure value corresponding to (MAX_I number) in the middle Index table is zero. Furthermore, the sorting unit 330 puts the color value of (MAX_I number) of the middle Index table in the J-th record of the small Index table. At Step S808, it is further assumed the small Index value of (MAX_I number) of the middle Index table is J.

At Step S809, the sorting unit 330 adds one to the value of the counter J.

At Step S810, the sorting unit 330 determines whether the value of the counter J is 128. When the value of J is 128, in other words, when color values corresponding to all small Index values are set, the process is terminated. When a small Index value that is not set is present, the process control returns to Step S802 to repeat the process.

Figure 23:
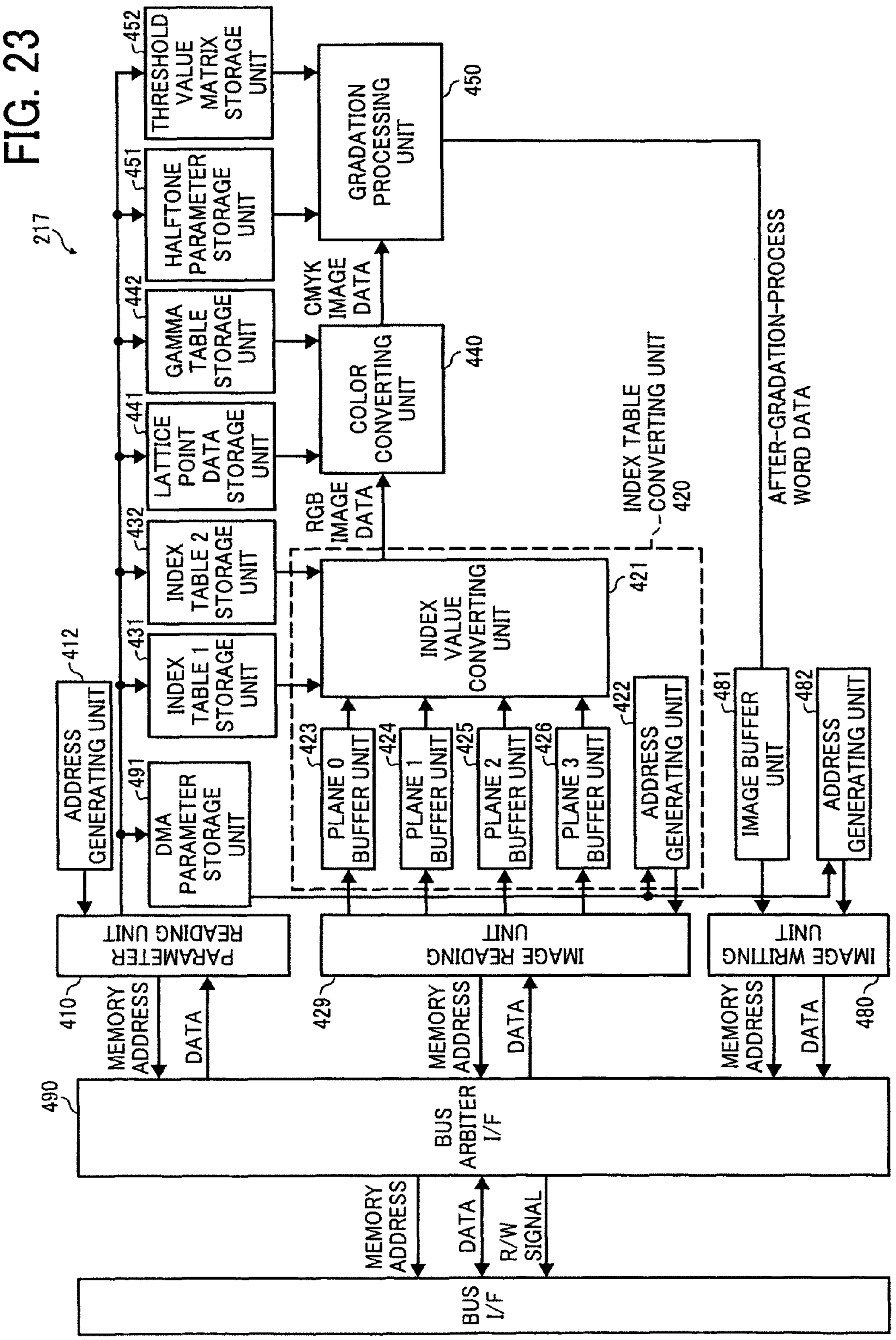
FIG. 23 is a diagram illustrating an example of the hardware configuration of an image processing unit.

FIG. 23 is a diagram illustrating an example of the hardware configuration of the image processing unit 217. The image processing unit 217 includes a bus arbiter I/F 490, a parameter reading unit 410, an address generating unit 412, a DMA parameter storage unit 491, an image reading unit 429, an Index table converting unit 420, a color converting unit 440, a gradation processing unit 450, an image buffer unit 481, an address generating unit 482, and an image writing unit 480.

The image processing unit 217 further includes an Index table 1 storage unit 431, an Index table 2 storage unit 432, a lattice point data storage unit 441, a gamma table storage unit 442, a half-tone parameter storage unit 451, and a threshold value matrix storage unit 452, as storage units that store various types of parameters.

The parameter reading unit 410 acquires parameters according to image processing from the main memory 130. The acquired parameters are respectively stored in the storage units. The parameter reading unit 410 realizes the transfer of data from the main memory 130 by using DMA.

The address generating unit 412 generates an address, on the main memory 130, of the parameter read by the parameter reading unit 410. The DMA parameter storage unit 491 holds parameters according to DMA transfer when the parameter reading unit 410 performs DMA transfer. As a result, when storing an image after image processing in the main memory 130, DMA transfer can be performed by using the parameters.

The image reading unit 429 reads image data stored in the Index & RGBA image storage unit 8 located on the main memory 130 and outputs the image data to the Index table converting unit 420.

The Index table converting unit 420 converts an image drawn by an Index value into an image drawn by an RGB value. The Index table converting unit 420 includes an Index value converting unit 421, a plane 0 buffer unit 423, a plane 1 buffer unit 424, a plane 2 buffer unit 425, a plane 3 buffer unit 426, and an address generating unit 422.

The address generating unit 422 generates an address on the main memory 130 when the image reading unit 429 reads image data. The plane 0 buffer unit 423 to the plane 3 buffer unit 426 respectively store image data stored in the plane 0 area to the plane 3 area that are located on the main memory 130.

The Index value converting unit 421 converts image data expressed by an Index format into image data expressed by an RGB value. The Index value converting unit 421 reads a high-order one-bit or two-bit header part among the image data stored in the plane 0 buffer unit 423 to acquire pixel data expressed by an Index format.

More specifically, in the case of the Index format 1 illustrated in FIG. 5, a high-order one-bit value is “1”. In the case of the Index format 2 illustrated in FIG. 5, a high-order two-bit value is “01”. Therefore, data stored in the plane 0 buffer unit 423 and the plane 1 buffer unit 424 is acquired by using these values. The Index value converting unit 421 further converts the acquired image data into an RGB value by using the small Index table stored in the Index table 1 storage unit 431 or the Index table stored in the Index table 2 storage unit 432 and outputs the RGB value to the color converting unit 440.

The color converting unit 440 converts image data expressed by the RGB value into image data expressed by a CMY value. The color converting unit 440 further converts the image data expressed by the CMY value into image data expressed by a CMYK value by using under-color removal. The color converting unit 440 utilizes lattice point data stored in the lattice point data storage unit 441 and a gamma table stored in the gamma table storage unit 442 to perform these processes.

The gradation processing unit 450 converts the image data expressed with the CMYK value into image data expressed by area coverage modulation. The gradation processing unit 450 utilizes a half-tone parameter stored in the half-tone parameter storage unit 451 and a threshold value matrix stored in the threshold value matrix storage unit 452 to perform these processes.

The image buffer unit 481 stores the image data that is processed by the gradation processing unit 450. It is preferable that the image buffer unit 481 has larger capacity than an access unit to the main memory 130. The access unit to the main memory 130 is, for example, a burst length of the main memory 130. The image writing unit 480 makes the main memory 130 store the image data held in the image buffer unit 481 by using DMA transfer. The address generating unit 482 generates an address on the main memory 130 when the image writing unit 480 makes the main memory 130 store image data.

The bus arbiter I/F 490 adjusts the input and output of data between the image processing unit 217 and the main memory 130.

Figure 24:
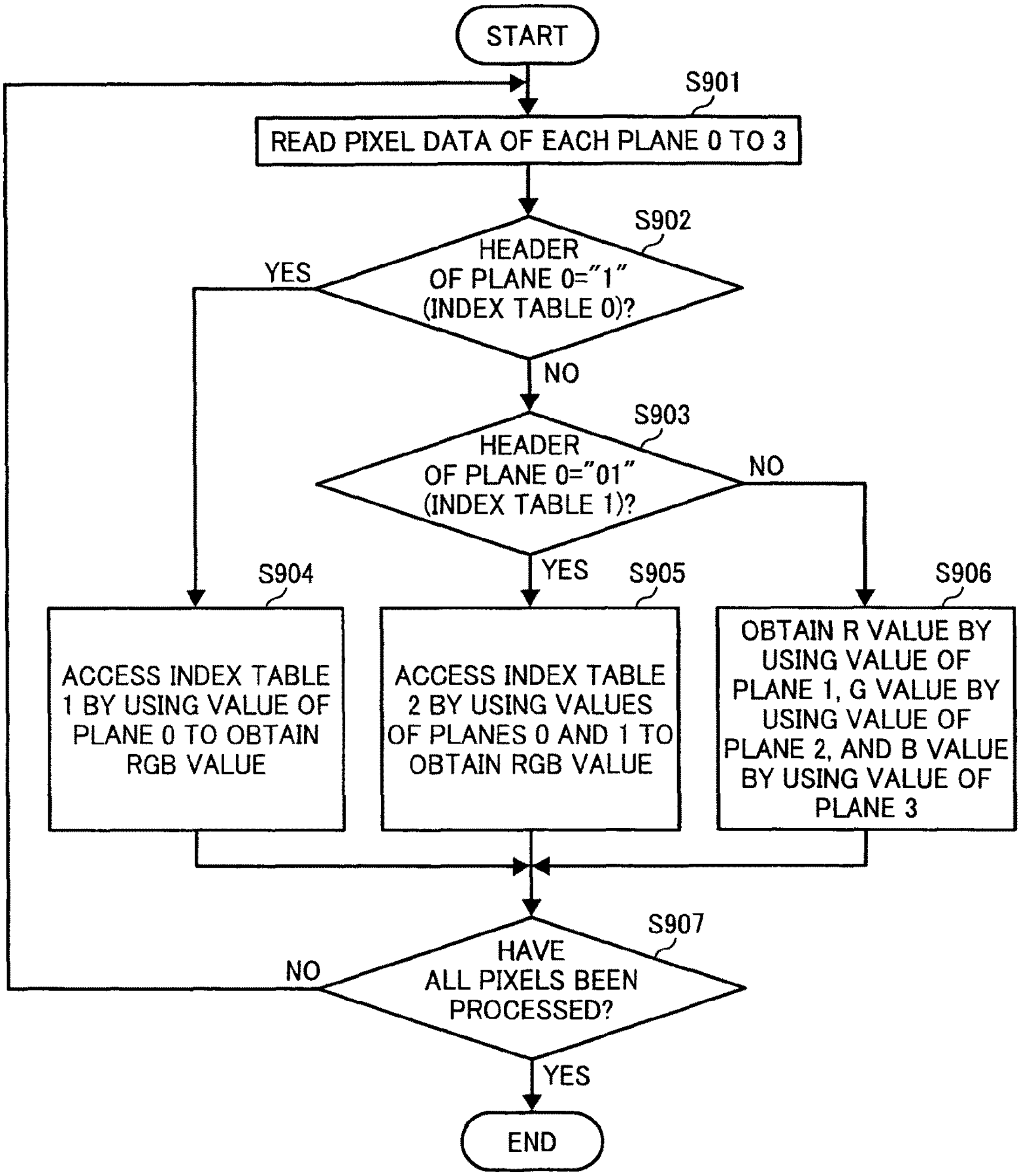
FIG. 24 is a flowchart explaining an Index table conversion process.

FIG. 24 is a flowchart explaining an Index table conversion process performed in the Index value converting unit 421. At Step S901 of FIG. 24, the Index value converting unit 421 reads the same one pixel data stored in the plane 0 buffer unit 423 to the plane 3 buffer unit 426.

At Step S902, the Index value converting unit 421 determines whether a high-order one-bit value of the plane 0 is "1". When it is "1", the Index value converting unit 421 determines that it is the header of the Index table 1, and the process control advances to Step S904. On the other hand, the process control advances to Step S903 when it is not "1".

At Step S903, the Index value converting unit 421 determines whether a high-order two-bit value of the plane 0 is "01". When it is "01", the Index value converting unit 421 determines that it is the header of the Index table 2, and the process control advances to Step S905. On the other hand, the process control advances to Step S906 when it is not "01".

At Step S904, the Index value converting unit 421 accesses the small Index table stored in the Index table 1 storage unit 431 by using the value of the plane 0 to obtain an RGB value.

At Step S905, the Index value converting unit 421 accesses the Index table stored in the Index table 2 storage unit 432 by using the values of the plane 0 and the plane 1 to obtain an RGB value.

At Step S906, the Index value converting unit 421 decides an RGB value by using the value of the plane 1 as an R value, the value of the plane 2 as a G value, and the value of the plane 3 as a B value.

At Step S907, the Index value converting unit 421 determines whether the process for all pixels read by the image reading unit 429 is terminated. When the process for all pixels is terminated, the process is terminated. When the process for all pixels is not terminated, the process control returns to Step S901 to repeat the process.

Figure 25:
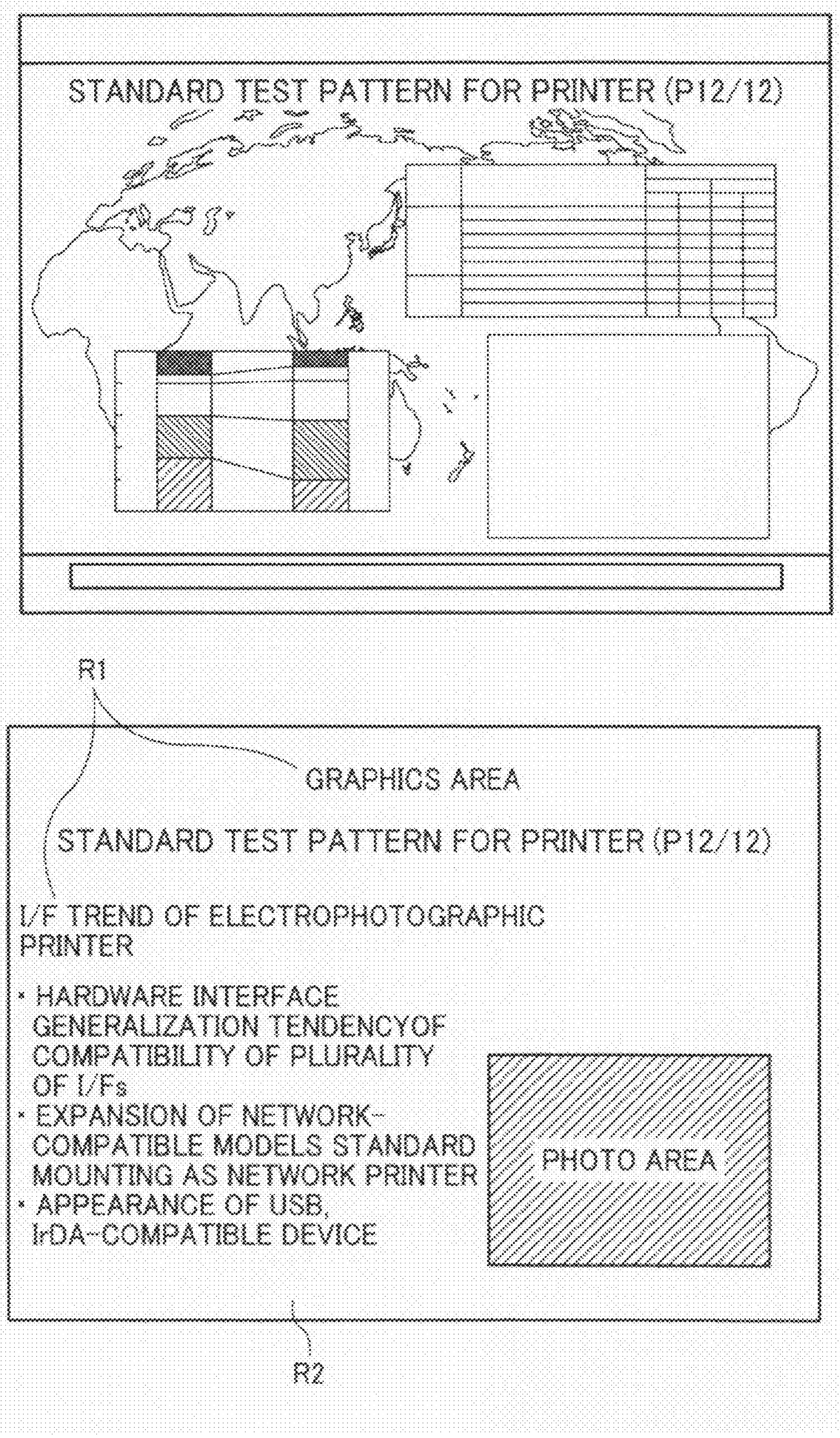
FIG. 25 is a diagram illustrating an example of a drawing process.

FIG. 25 is a diagram illustrating an example of a drawing process. In FIG. 25, an image illustrated at the left side is drawn on three areas of an area R1, an area R2, and a photo area. The area R1 is a character area and the area R2 is a graphics area. Because these areas have the number of colors fewer than that of a photo image, a drawing process can be realized at high speed by performing drawing according to an Index value.

FIGS. 26A to 26E are diagrams illustrating an example of a drawing command acquired from PDL. FIG. 26A is a parameter setting command, FIGS. 26B and 26C are a graphics drawing command, FIG. 26D is a photo image drawing command, and FIG. 26E is a quit command.

According to the present embodiment, the drawing of the graphics drawing command of FIGS. 26B and 26C is realized by drawing according to an Index value. In addition, FIG. 26B is a command for drawing a quadrangle and FIG. 26C is a command for drawing a horizontal line. Therefore, in the case of FIG. 26B, a square measure for performing drawing every drawing command is a value obtained by multiplying an X width by a Y width. In the case of FIG. 26C, the square measure is the X width.

Figure 27:
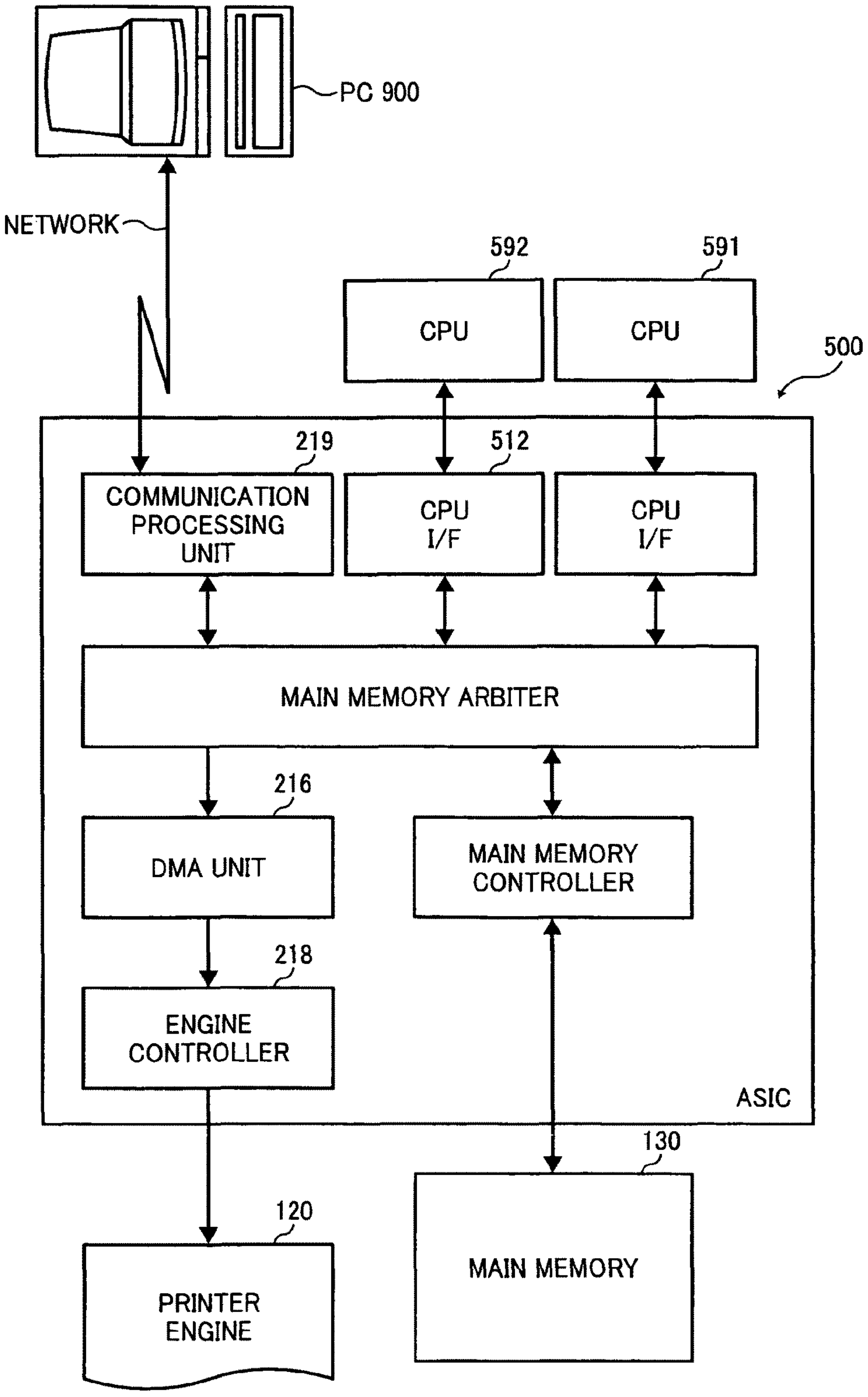
FIG. 27 is a diagram illustrating the configuration of a control unit provided in the color printer.

FIG. 27 is a diagram illustrating the configuration of a control unit 500 provided in the color printer 1000. The control unit 500 can be provided in the color printer 1000 in place of the control unit 100 or the control unit 200.

Unlike the control unit 200, the control unit 500 includes a CPU I/F 512 and a CPU 592. The other units of the control unit 500 are equal to those of the control unit 200. Therefore, it will be below explained about the CPU I/F 512 and the CPU 592. Their descriptions for the other units are omitted.

Each of a CPU 591 and the CPU 592 realizes one or more functions among the Index table generating unit 4, the drawing processing unit 21, and the image processing unit 22. Particularly, an image processing method according to the present embodiment can be effectively realized by pipeline processing by separating the process of the Index table generating unit 4 from the other processes.

Figure 28:
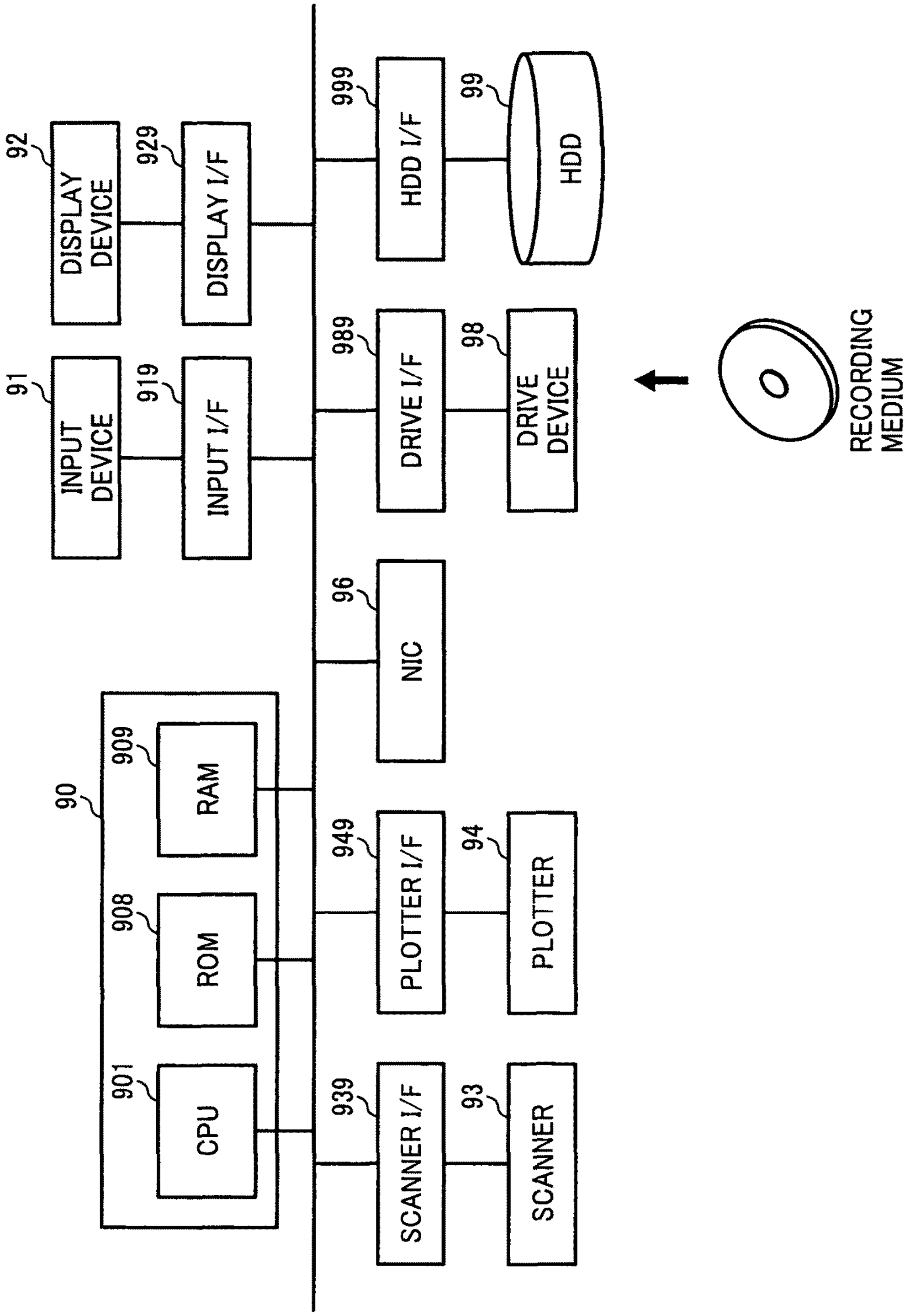
FIG. 28 is a diagram explaining the configuration of a computer for realizing the image processing apparatus according to an embodiment of the present invention.

FIG. 28 is a diagram explaining the configuration of a computer for realizing the image processing apparatus according to an embodiment of the present invention. The computer of FIG. 28 includes a main processing unit 90, an input device 91, a display device 92, a scanner 93, a plotter 94, an NIC 96, a drive device 98, a hard disk drive (hereinafter, "HDD") 99, an input I/F 919, a display I/F 929, a scanner I/F 939, a plotter I/F 949, a drive I/F 989, and an HDD I/F 999.

The main processing unit 90 executes a computer program to realize each function. The main processing unit 90 includes, for example, a CPU 901, a ROM 908, and a RAM 909. The CPU 901 executes a computer program to control each device included in the computer. The ROM 908 stores, for example, a computer program, parameters, and the like and they are provided to the CPU 901. The RAM 909 is provided as a working memory, for example, when the CPU 901 executes the computer program.

The input device 91 is configured as an input device such as a keyboard or a mouse and inputs an instruction or the like for the computer. The display device 92 displays a status or the like of the computer. The scanner 93 optically reads an image and generates image data. The plotter 94 forms an image on a medium and outputs the formed image.

The NIC 96 realizes an interface function when the computer is connected to the outside via the network and performs its control. The drive device 98 includes a recording medium that is inserted thereinto. The drive device 98 reads out information recorded in the recording medium and records information in the recording medium. The HDD 99 is a storage means that stores high-capacity data.

The input I/F 919, the display I/F 929, the scanner I/F 939, the plotter I/F 949, the drive I/F 989, and the HDD I/F 999 are interfaces when the input device 91, the display device 92, the scanner 93, the plotter 94, the drive device 98, and the HDD 99 are connected to the main processing unit 90 via a bus.

As described above, according to an aspect of the present invention, it is possible to provide an image processing apparatus, an image processing method, and computer program produce that perform the drawing of an image onto a memory at high speed while holding the image quality of input image data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a processor;
a color information generating unit that generates information of color values included in input image data;
an Index table generating unit that generates an Index table in which a first identification information according to a hash value is associated with a first predetermined number of color values among the color values;
a drawing unit that generates a second identification information according to the hash value for each color value included in the input image data and performs, when the second identification information is different from the first identification information associated with a color value included in the Index table having a same value as the color value, drawing according to the color value, and when the second identification information is the same as the first identification information, drawing according to the first identification information; and
a converting unit that converts an image drawn by the identification information into a color value corresponding to the identification information;
wherein
the Index table generating unit further generates header information identifying which drawing of drawing according to the identification information and drawing according to the color value is performed for each pixel included in an image according to the input image data,
the drawing unit
generates first-format pixel data including the header information and the identification information by performing drawing according to the identification information and
generates second-format pixel data including the header information and the color value by performing drawing according to the color value, and
the image processing apparatus further includes a storage unit that stores image data including two pixel formats of the first format and the second format in one area.

2. The image processing apparatus according to claim 1, wherein the converting unit acquires, for each pixel of the image data stored in the storage unit, information indicating which of the first format and the second format is a format of the pixel from the header information included for each pixel data and converts the first-format pixel data into the color value based on the Index table.

3. The image processing apparatus according to claim 1, wherein
the Index table generating unit generates, for each object included in the input image data, the Index table when the number of color values included in the object is smaller than the first predetermined number.

4. The image processing apparatus according to claim 1, wherein in the Index table, the first identification information according to the hash value is associated with the first predetermined number of color values by which a drawing square measure is larger among the color values included in the input image data.

5. The image processing apparatus according to claim 1, wherein
the Index table generating unit further associates a third identification information of which data volume is fewer than that of the first identification information with a second predetermined number of color values that is smaller than the first predetermined number, and
the drawing unit draws a pixel having the color value associated with the third identification information by using the third identification information.

6. The image processing apparatus according to claim 1, wherein the storage unit further has an area that holds the Index table.

7. An image processing method in an image processing apparatus, comprising:
generating information of color values included in input image data;
generating an Index table in which a first identification information according to a hash value is associated with a first predetermined number of color values among the color values;
generating a second identification information according to the hash value for each color value included in the input image data;
performing,
when the second identification information is different from the first identification information associated with a color value included in the Index table having a same value as the color value, drawing according to the color value, and
when the second identification information is the same as the first identification information, drawing according to the first identification information; and
converting an image drawn by the identification information into a color value corresponding to the identification information;
wherein
the generating the Index table includes further generating header information identifying which drawing of drawing according to the identification information and drawing according to the color value is performed for each pixel included in an image according to the input image data,
the performing includes
generating first-format pixel data including the header information and the identification information by performing drawing according to the identification information and
generating second-format pixel data including the header information and the color value by performing drawing according to the color value, and the image processing method further includes storing image data including two pixel formats of the first format and the second format in one area.

8. The image processing method according to claim 7, wherein the converting includes acquiring, for each pixel of the image data stored at the storing, information indicating which of the first format and the second format is a format of the pixel from the header information included for each pixel data, and converting the first-format pixel data into the color value based on the Index table.

9. The image processing method according to claim 7, wherein the generating the Index table includes generating, for each object included in the input image data, the Index table when the number of color values included in the object is smaller than the first predetermined number.

10. The image processing method according to claim 7, wherein in the Index table, the first identification information according to the hash value is associated with the first predetermined number of color values by which a drawing square measure is larger among the color values included in the input image data.

11. The image processing method according to claim 7, wherein the generating the Index table further includes associating a third identification information of which data volume is fewer than that of the first identification information with a second predetermined number of color values that is smaller than the first predetermined number, and the performing includes drawing a pixel having the color value associated with the third identification information by using the third identification information.

12. The image processing method according to claim 7, wherein the storing includes holding the Index table.

13. A computer program product comprising a non-transitory computer-usable medium having computer-readable program codes embodied in the medium for image processing method in an image processing apparatus, the program codes when executed causing a computer to execute:

generating information of color values included in input image data;

generating an Index table in which a first identification information according to a hash value is associated with a first predetermined number of color values among the color values;

generating a second identification information according to the hash value for each color value included in the input image data;

performing, when the second identification information is different from the first identification information associated with a color value included in the Index table having a same value as the color value, drawing according to the color value, and when the second identification information is the same as the first identification information, drawing according to the first identification information; and converting an image drawn by the identification information into a color value corresponding to the identification information;

wherein the generating the Index table includes further generating header information identifying which drawing of drawing according to the identification information and drawing according to the color value is performed for each pixel included in an image according to the input image data, the performing includes generating first-format pixel data including the header information and the identification information by performing drawing according to the identification information and generating second-format pixel data including the header information and the color value by performing drawing according to the color value, and the program codes when executed causing the computer to further execute storing image data including two pixel formats of the first format and the second format in one area.

14. The computer program product according to claim 13, wherein the converting includes acquiring, for each pixel of the image data stored at the storing, information indicating which of the first format and the second format is a format of the pixel from the header information included for each pixel data, and converting the first-format pixel data into the color value based on the Index table.

15. The computer program product according to claim 13, wherein the generating the Index table includes generating, for each object included in the input image data, the Index table when the number of color values included in the object is smaller than the first predetermined number.

16. The computer program product according to claim 13, wherein in the Index table, the first identification information according to the hash value is associated with the first predetermined number of color values by which a drawing square measure is larger among the color values included in the input image data.

17. The computer program product according to claim 13, wherein the generating the Index table further includes associating a third identification information of which data volume is fewer than that of the first identification information with a second predetermined number of color values that is smaller than the first predetermined number, and the performing includes drawing a pixel having the color value associated with the third identification information by using the third identification information.

* * * * *